United States Patent
Takahashi et al.

(10) Patent No.: US 11,186,710 B2
(45) Date of Patent: Nov. 30, 2021

(54) THERMOPLASTIC ELASTOMER COMPOSITION AND METHOD OF PRODUCING THE SAME

(71) Applicant: SUMITOMO CHEMICAL COMPANY, LIMITED, Tokyo (JP)

(72) Inventors: Shun Takahashi, Chiba (JP); Risa Murata, Chiba (JP); Yuki Azuma, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 29 days.

(21) Appl. No.: 16/886,095

(22) Filed: May 28, 2020

(65) Prior Publication Data

US 2020/0377708 A1 Dec. 3, 2020

(30) Foreign Application Priority Data

May 31, 2019 (JP) .............................. JP2019-102956
Jan. 20, 2020 (JP) .............................. JP2020-006739

(51) Int. Cl.
*C08L 23/14* (2006.01)
(52) U.S. Cl.
CPC ........... *C08L 23/14* (2013.01); *C08L 2207/02* (2013.01)
(58) Field of Classification Search
CPC ............................ C08L 2207/02; C08L 23/14
See application file for complete search history.

(56) References Cited

U.S. PATENT DOCUMENTS

| | | | | |
|---|---|---|---|---|
| 6,143,813 A * | 11/2000 | Sezume | ................... | C08K 3/34 524/127 |
| 9,879,134 B2 | 1/2018 | Peterson et al. | | |
| 2009/0270561 A1* | 10/2009 | Ohtani | ................... | C08L 23/142 525/240 |
| 2013/0281641 A1* | 10/2013 | Kolb | ................... | C08F 210/02 526/126 |
| 2019/0232627 A1* | 8/2019 | Katsuno | ................... | B32B 7/027 |

FOREIGN PATENT DOCUMENTS

| | | |
|---|---|---|
| EP | 2588521 | 5/2013 |
| EP | 2886599 | 6/2015 |
| JP | 2013528247 | 7/2013 |
| JP | 2015193710 | 12/2017 |
| WO | 2012000884 | 1/2012 |

OTHER PUBLICATIONS

Extended European Search Report dated Sep. 15, 2020 in European Patent Application No. 20168181.4.

* cited by examiner

*Primary Examiner* — Mark S Kaucher
(74) *Attorney, Agent, or Firm* — Meunier Carlin & Curfman LLC

(57) ABSTRACT

There is provided a thermoplastic elastomer composition from which a molded article having an appearance suitable for non-painting use can be produced. In the thermoplastic elastomer composition containing at least two olefin polymers, a content of an insoluble component in ortho-dichlorobenzene at 140° C. is 20 wt % to 50 wt % and an isothermal crystallization time measured at 130° C. is 300 seconds or longer.

14 Claims, No Drawings

THERMOPLASTIC ELASTOMER COMPOSITION AND METHOD OF PRODUCING THE SAME

CROSS REFERENCE TO RELATED APPLICATIONS

This application claims priority to and is a United States Application of JP 2019-102956 filed May 31, 2019 and JP 2020-006739 filed Jan. 20, 2020, both of which are incorporated by reference herein.

BACKGROUND OF THE INVENTION

Field of the Invention

The present invention relates to a thermoplastic elastomer composition and a method of producing the same.

Description of the Related Art

Since a molded article including a thermoplastic elastomer composition containing an olefin polymer has a high tensile strength or tear strength, and has an excellent low-temperature impact resistance so as to withstand use in a region with a cold climate, the molded article is used, for example, as a material for forming an automobile-related member.

For example, JP-A-2013-528247 discloses a resin composition including: a matrix having a specific molecular weight distribution and crystallinity and containing a propylene homopolymer; and a dispersed phase containing an ethylene-propylene copolymer, and used in an automobile part and the like. In JP-A-2013-528247, the resin composition is produced by reacting a monomer, a crosslinking agent, an antioxidant, and a nucleating agent in one or more reactors.

In addition, JP-A-2015-193710 discloses a resin composition containing a propylene homopolymer and an ethylene-α-olefin copolymer, that is, a thermoplastic elastomer composition containing a propylene-ethylene copolymer, and two ethylene-α-olefin copolymers each having a specific density and MFR, as essential components.

SUMMARY OF THE INVENTION

In recent years, regarding the resin composition used in an automobile part and the like, a non-painted molded article including the thermoplastic elastomer composition such as an airbag cover provided in a visible portion has been considered. It is required for a molded article including a thermoplastic elastomer composition to have an excellent appearance regardless of a shape thereof.

However, in a case where a flat molded article having a surface in which a groove-shaped thin portion is formed is injection molded from the resin composition described in JP-A-2013-528247, a gloss unevenness easily occurs in a surface in the vicinity of the thin portion, and an excellent appearance that does not require a painting process cannot be obtained.

In addition, there is a need for a thermoplastic elastomer composition from which an excellent appearance of the molded article can be obtained regardless of a shape of the molded article as compared to the thermoplastic elastomer composition described in JP-A-2015-193710.

An object of an aspect of the present invention is to provide a thermoplastic elastomer composition from which a molded article having an appearance suitable for non-painting use even when the molded article is injection molded into a shape having a portion having a thickness different from those of other portions can be produced, and a method of producing the same.

As a result of intensive studies on the above problems, the inventors of the present invention found that, in a thermoplastic elastomer composition, a content of an insoluble component in ortho-dichlorobenzene and an isothermal crystallization time contribute to the appearance of the molded article including the composition.

More specifically, the inventors of the present invention found that the molded article including the thermoplastic elastomer composition satisfying specific conditions of a content of an insoluble component in ortho-dichlorobenzene and an isothermal crystallization time stably exhibits an excellent appearance, thereby completing the present invention. That is, the present invention includes the following inventions.

<1> A thermoplastic elastomer composition containing at least two olefin polymers, the thermoplastic elastomer composition satisfying the following requirements (I) and (II):

(I) a content of an insoluble component in ortho-dichlorobenzene at 140° C. is 20 parts by weight to 50 parts by weight with respect to a total of 100 parts by weight of the thermoplastic elastomer composition, the content being measured by using gel permeation chromatography; and (II) an isothermal crystallization time measured at 130° C. using a heat flux-type differential scanning calorimeter is 300 seconds or longer.

<2> The thermoplastic elastomer composition according to <1>, in which the content of the insoluble component is 20 parts by weight to 35 parts by weight.

<3> The thermoplastic elastomer composition according to <1> or <2>, in which the content of the insoluble component is 24 parts by weight to 30 parts by weight.

<4> The thermoplastic elastomer composition according to any one of <1> to <3>, in which the isothermal crystallization time is 1,500 seconds to 2,000 seconds.

<5> The thermoplastic elastomer composition according to any one of <1> to <4>, in which the thermoplastic elastomer composition is a composition obtained by melting and kneading a heterophasic propylene polymer material in the presence of a crosslinking agent and a crosslinking aid, the heterophasic propylene polymer material contains a propylene copolymer (A) and a propylene copolymer (B), a content of the propylene copolymer (A) is 45 parts by weight to 65 parts by weight, and a content of the propylene copolymer (B) is 35 parts by weight to 55 parts by weight, with respect to a total of 100 parts by weight of the propylene copolymer (A) and the propylene copolymer (B), the propylene copolymer (A) includes:
a monomer unit (A1) derived from propylene; and
a monomer unit (A2) derived from at least one monomer selected from the group consisting of ethylene and α-olefin having 4 to 12 carbon atoms, a content of the monomer unit (A1) is 95 parts by weight to 99.9 parts by weight, and a content of the monomer unit (A2) is 0.1 parts by weight to 5 parts by weight, with respect to a total of 100 parts by weight of the monomer unit (A1) and the monomer unit (A2), the propylene copolymer (B) includes:
a monomer unit (B1) derived from propylene; and
a monomer unit (B2) derived from at least one monomer selected from the group consisting of ethylene and α-olefin having 4 to 12 carbon atoms, and a content of the monomer unit (B1) is 20 parts by weight to 78 parts by weight, and a content of the monomer unit (B2) is 22 parts by weight to 80 parts by weight, with respect to a total of 100 parts by weight of the monomer unit (B1) and the monomer unit (B2).

<6> The thermoplastic elastomer composition according to <5>, in which a weight average molecular weight of the propylene copolymer (A) is $1.0 \times 10^5$ to $7.0 \times 10^5$, and a weight average molecular weight of the propylene copolymer (B) is $4.0 \times 10^4$ to $1.3 \times 10^6$.

<7> The thermoplastic elastomer composition according to <5> or <6>, in which a weight average molecular weight of the propylene copolymer (B) is $2.0 \times 10^5$ to $1.1 \times 10^6$.

<8> The thermoplastic elastomer composition according to any one of <5> to <7>, in which the crosslinking agent is organic peroxide.

<9> The thermoplastic elastomer composition according to any one of <5> to <8>, in which the crosslinking aid is at least one compound selected from the group consisting of a maleimide compound, a multi-functional vinyl compound, and a multi-functional acrylate compound.

<10> The thermoplastic elastomer composition according to any one of <5> to <9>, in which the melting and kneading is performed at a temperature of 170° C. to 270° C.

<11> The thermoplastic elastomer composition according to any one of <5> to <10>, in which the heterophasic propylene polymer material is a polymer material obtained by a multi-stage polymerization.

<12> A method of producing a thermoplastic elastomer composition, the method including a step of melting and kneading a heterophasic propylene polymer material in the presence of a crosslinking agent and a crosslinking aid, in which the heterophasic propylene polymer material contains a propylene copolymer (A) and a propylene copolymer (B), a content of the propylene copolymer (A) is 45 parts by weight to 65 parts by weight, and a content of the propylene copolymer (B) is 35 parts by weight to 55 parts by weight, with respect to a total of 100 parts by weight of the propylene copolymer (A) and the propylene copolymer (B), the propylene copolymer (A) includes:

a monomer unit (A1) derived from propylene; and a monomer unit (A2) derived from at least one monomer selected from the group consisting of ethylene and α-olefin having 4 to 12 carbon atoms, a content of the monomer unit (A1) is 95 parts by weight to 99.9 parts by weight, and a content of the monomer unit (A2) is 0.1 parts by weight to 5 parts by weight, with respect to a total of 100 parts by weight of the monomer unit (A1) and the monomer unit (A2), the propylene copolymer (B) includes:

a monomer unit (B1) derived from propylene; and a monomer unit (B2) derived from at least one monomer selected from the group consisting of ethylene and α-olefin having 4 to 12 carbon atoms, a content of the monomer unit (B1) is 20 parts by weight to 78 parts by weight, and a content of the monomer unit (B2) is 22 parts by weight to 80 parts by weight, with respect to a total of 100 parts by weight of the monomer unit (B1) and the monomer unit (B2), and the thermoplastic elastomer composition satisfies the following requirements (I) and (II):

(I) a content of an insoluble component in ortho-dichlorobenzene at 140° C. is 20 parts by weight to 50 parts by weight with respect to a total of 100 parts by weight of the thermoplastic elastomer composition, the content being measured by using gel permeation chromatography; and (II) an isothermal crystallization time measured at 130° C. using a heat flux-type differential scanning calorimeter is 300 seconds or longer.

<13> A molded article including the thermoplastic elastomer composition according to any one of <1> to <11>.

<14> An airbag cover including the thermoplastic elastomer composition according to any one of <1> to <11>.

According to an aspect of the present invention, it is possible to provide a thermoplastic elastomer composition from which a molded article having an appearance suitable for non-painting use can be produced, and its related technology.

DETAILED DESCRIPTION OF THE PREFERRED EMBODIMENTS

Hereinafter, an embodiment of the present invention will be described, but the present invention is not limited to the embodiment. The present invention is not limited to the respective components described below, and various changes may be made within the scope of the claims. The technical scope of the present invention also includes embodiments and examples obtained by appropriately combining technical means disclosed in different embodiments and examples. In addition, unless otherwise specified herein, a numerical range expressed as "A to B" means "A or more and B or less".

Thermoplastic Elastomer Composition

A thermoplastic elastomer composition according to an aspect of the present invention contains at least two olefin polymers, and satisfies requirements (I) and (II). In addition, the thermoplastic elastomer composition according to an aspect of the present invention contains a crosslinking agent and a crosslinking aid, and has a structure in which one kind of olefin polymers or at least two kinds of olefin polymers are crosslinked to each other by the crosslinking agent and the crosslinking aid.

By satisfying the requirements (I) and (II), even in a case where the thermoplastic elastomer composition according to an aspect of the present invention is injection molded into a shape having a portion (thin portion) having a thickness different from those of other portions, it is possible to produce a molded article that can prevent a gloss unevenness from being generated in the portion and has an appearance suitable for non-painting use. Therefore, the thermoplastic elastomer composition can be preferably used for a molded article such as an airbag cover of an airbag provided in an automobile interior part such as an instrument panel or a pillar, an automobile exterior part such as a mold, a household appliance member, a constructional member, furniture, or general merchandise.

Solubility in Ortho-Dichlorobenzene at 140° C.

For the thermoplastic elastomer composition, as the requirement (I), a content of an insoluble component in ortho-dichlorobenzene at 140° C. is 20 parts by weight to 50 parts by weight with respect to 100 parts by weight of the thermoplastic elastomer composition, the content being measured by using gel permeation chromatography.

The thermoplastic elastomer composition contains at least two olefin polymers of a non-crosslinked olefin polymer and a crosslinked olefin polymer. The non-crosslinked olefin polymer contained in the thermoplastic elastomer composition is dissolved in ortho-dichlorobenzene at 140° C. On the other hand, the crosslinked olefin polymer is not dissolved in ortho-dichlorobenzene at 140° C., and is eluted as an insoluble component. That is, the requirement (I) can be analyzed by using a difference in solubility in ortho-dichlorobenzene at 140° C., and may be a degree of three-dimensional crosslinking of the olefin polymers contained in the thermoplastic elastomer composition.

In the thermoplastic elastomer composition according to an aspect of the present invention, a content of the insoluble component in ortho-dichlorobenzene at 140° C. is 20 parts by weight to 50 parts by weight, preferably 20 parts by weight to 45 parts by weight, more preferably 20 parts by weight to 35 parts by weight, and still more preferably 24 parts by weight to 30 parts by weight, with respect to 100 parts by weight of the thermoplastic elastomer composition. When the content of the insoluble component in ortho-dichlorobenzene at 140° C. is 20 parts by weight to 50 parts by weight, the appearance of the molded article can be improved.

For the content of the insoluble component in ortho-dichlorobenzene at 140° C., the types and addition amounts of a crosslinking agent and a crosslinking aid that are contained in the thermoplastic elastomer composition described below, and a temperature and a time of the melting and kneading may be adjusted.

A measurement method of the solubility of the thermoplastic elastomer composition in ortho-dichlorobenzene at 140° C. will be described in detail in examples.

Solubility in Ortho-Dichlorobenzene at 50° C.

It is preferable that the thermoplastic elastomer composition contain two olefin polymers having different solubilities in ortho-dichlorobenzene at 50° C. By using the two olefin polymers having different solubilities in ortho-dichlorobenzene at 50° C., an isothermal crystallization time of the olefin polymer described below can be preferably adjusted.

In the thermoplastic elastomer composition according to an aspect of the present invention, a content of an insoluble component in ortho-dichlorobenzene at 50° C. is preferably 45 parts by weight to 65 parts by weight, and more preferably 47 parts by weight to 55 parts by weight, with respect to 100 parts by weight of the thermoplastic elastomer composition.

When the content of the insoluble component in ortho-dichlorobenzene at 50° C. is within the above range, an appearance of a molded article obtained can be improved without impairing a low temperature impact performance and a material strength of the molded article.

In addition, in the present invention, contents of the insoluble component and a soluble component in ortho-dichlorobenzene at 50° C., weight average molecular weights (Mws) thereof, and the amounts of methyl groups per 1,000 carbons ($CH_3$/1,000 C) therein can be measured by the following cross-fractionation chromatography (CFC), and a measurement method thereof will be described in detail in examples.

Isothermal Crystallization Time

For the thermoplastic elastomer composition according to an aspect of the present invention, as the requirement (II), an isothermal crystallization time measured at 130° C. using a heat flux-type differential scanning calorimeter is 300 seconds or longer, more preferably 300 seconds to 3,000 seconds, still more preferably 500 seconds to 3,000 seconds, and yet still more preferably 1,500 seconds to 2,000 seconds.

Within the above range, when the isothermal crystallization time in the thermoplastic elastomer composition is 300 seconds or longer, the appearance of the molded article can be improved, and when the isothermal crystallization time in the thermoplastic elastomer composition is 2,000 seconds or shorter, a rigidity of the molded article can be improved.

It should be noted that, herein, the isothermal crystallization time is a value measured by using the following method.

The thermoplastic elastomer composition is interposed between flat plates, pressed at 230° C. and 1 MPa for 5 minutes, and then cooled to obtain a press sheet (thickness of 0.2 mm). The obtained press sheet is used as a measuring sample.

The measuring sample is held at 200° C. for 5 minutes, and then cooled to 130° C. at 320° C. to 340° C./min and held, under a nitrogen atmosphere using a heat flux-type differential scanning calorimeter. In this case, a relationship between a calorific value obtained by crystallization of the sample and a time is measured, and the time taken to reach one-half of the total calorific value is taken as an isothermal crystallization time (seconds).

Other Physical Properties

In addition, it is preferable that the thermoplastic elastomer composition further satisfy the following physical properties.

A melt flow rate of the thermoplastic elastomer composition measured in accordance with JIS K7210:1999 at a temperature of 230° C. and a measuring load of 21.18 N is preferably 1 g/10 min to 50 g/10 min, and more preferably 5 g/10 min to 30 g/10 min, from the viewpoint of the appearance of the obtained molded article.

In addition, a melting temperature of the thermoplastic elastomer composition is preferably 140° C. or higher, and more preferably 145° C. or higher, from the viewpoint of the rigidity of the obtained molded article. In general, the melting temperature is 175° C. or lower. The melting temperature is a peak temperature of an endothermic peak having the highest peak temperature in a differential scanning calorimetry curve measured with a differential scanning calorimeter during a temperature-raising operation. The differential scanning calorimetry curve may be measured with the differential scanning calorimeter under the following conditions, and the melting temperature may be obtained from the differential scanning calorimetry curve during the temperature-raising operation.

Olefin Polymer

The thermoplastic elastomer composition may contain at least two olefin polymers of a crosslinked olefin polymer that is three-dimensionally crosslinked and a non-crosslinked olefin polymer that is not three-dimensionally crosslinked, and, in a preferred aspect of the present invention, the thermoplastic elastomer composition may contain at least two olefin polymers of a crosslinked olefin polymer and a non-crosslinked olefin polymer. In this case, examples of the at least two olefin polymers can include an olefin polymer that is a soluble component in ortho-dichlorobenzene at 50° C. and an olefin polymer that is an insoluble component in ortho-dichlorobenzene at 50° C.

The thermoplastic elastomer composition according to an aspect of the present invention may contain an olefin polymer, and preferably contain an olefin polymer that is a soluble component in ortho-dichlorobenzene at 50° C. That is, in order for the thermoplastic elastomer composition according to an aspect of the present invention to satisfy the requirements (I) and (II), the thermoplastic elastomer composition may contain a crosslinked olefin polymer, and may contain an olefin polymer that is a soluble component in ortho-dichlorobenzene at 50° C.

Heterophasic Propylene Polymer Material

The thermoplastic elastomer composition according to an aspect of the present invention may preferably contain, as an olefin polymer, a heterophasic propylene polymer material containing a propylene copolymer (A) and a propylene copolymer (B). The heterophasic propylene polymer material may be a thermoplastic elastomer composition containing a crosslinked product that is three-dimensionally crosslinked by the crosslinking agent and the crosslinking aid.

In general, the heterophasic propylene polymer material is obtained by a multi-stage polymerization, contains the propylene copolymer (A) and the propylene copolymer (B), and is a mixture having a structure in which a dispersed phase composed of one propylene copolymer is uniformly dispersed in a matrix composed of another propylene copolymer.

A melting temperature of the heterophasic propylene polymer material is preferably 140° C. or higher, and more preferably 145° C. or higher, from the viewpoint of a release property of the molded article at the time of injection molding. In general, the melting temperature is 175° C. or lower. The melting temperature is a peak temperature of an endothermic peak having the highest peak temperature in a differential scanning calorimetry curve measured with a differential scanning calorimeter during a temperature-raising operation. The differential scanning calorimetry curve is measured with the differential scanning calorimeter under the following conditions, and the melting temperature is obtained from the differential scanning calorimetry curve during the temperature-raising operation. For example, the melting temperature may be obtained under the following measurement conditions.

Temperature lowering operation: The heterophasic propylene polymer material is melted at 220° C., and then a temperature is lowered from 220° C. to −90° C. at a temperature lowering rate of 5° C./min.

Temperature-raising operation: After the temperature lowing operation, the temperature is immediately raised from −90° C. to 200° C. at 5° C./min.

Propylene Copolymer (A)

The propylene copolymer (A) includes: a monomer unit (A1) derived from propylene; and a monomer unit (A2) derived from at least one monomer selected from the group consisting of ethylene and α-olefin having 4 to 12 carbon atoms. A content of the monomer unit (A1) is 95 wt % to 99.9 wt %, more preferably 97 wt % to 99 wt %, and still more preferably 97 wt % to 98.5 wt %, with respect to a total of 100 wt % of the monomer unit (A1) and the monomer unit (A2). A content of the monomer unit (A2) is 0.1 wt % to 5 wt %, more preferably 1 wt % to 3 wt %, and still more preferably 1.5 wt % to 3 wt %, with respect to the total of 100 wt % of the monomer unit (A1) and the monomer unit (A2). When the contents of the monomer unit (A1) and monomer unit (A2) are within this range, the obtained molded article may have an excellent appearance. The content of the monomer unit (A2) can be obtained by infrared spectroscopy.

A weight average molecular weight of the propylene copolymer (A) is preferably $1.0\times10^5$ to $7.0\times10^5$, and more preferably $1.0\times10^5$ to $3.0\times10^5$.

Examples of the α-olefin having 4 to 12 carbon atoms that constitutes the monomer unit (A2) can include 1-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 2-ethyl-1-hexene, and 2,2,4-trimethyl-1-pentene.

A monomer constituting the monomer unit (A2) is preferably ethylene and α-olefin having 4 to 10 carbon atoms, and more preferably ethylene, 1-butene, 1-hexene, and 1-octene. Among them, the monomers can be used alone or in combination of two or more thereof.

The propylene copolymer (A) may also be a random copolymer or a block copolymer.

Propylene Copolymer (B)

The propylene copolymer (B) includes: a monomer unit (B1) derived from propylene; and a monomer unit (B2) derived from at least one monomer selected from the group consisting of ethylene and α-olefin having 4 to 12 carbon atoms. A content of the monomer unit (B1) is 20 wt % to 78 wt %, more preferably 30 wt % to 70 wt %, and still more preferably 40 wt % to 65 wt %, with respect to a total of 100 wt % of the monomer unit (B1) and the monomer unit (B2). In addition, a content of the monomer unit (B2) is 22 wt % to 80 wt %, more preferably 30 wt % to 70 wt %, and still more preferably 35 wt % to 60 wt %, with respect to a total of 100 wt % of the monomer unit (B1) and the monomer unit (B2). When the contents of the monomer unit (B1) and monomer unit (B2) are within this range, the obtained molded article may have an excellent appearance. The content of the monomer unit (B2) can be obtained by infrared spectroscopy.

A weight average molecular weight of the propylene copolymer (B) is preferably $4.0\times10^4$ to $1.3\times10^6$, and more preferably $2.0\times10^5$ to $1.1\times10^6$.

Examples of the α-olefin having 4 to 12 carbon atoms that constitutes the monomer unit (B2) can include 1-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 2-ethyl-1-hexene, and 2,2,4-trimethyl-1-pentene.

A monomer constituting the monomer unit (B2) is preferably ethylene and α-olefin having 4 to 10 carbon atoms, and more preferably ethylene, 1-butene, 1-hexene, and 1-octene. Among them, the monomers can be used alone or in combination of two or more thereof.

The propylene copolymer (B) may also be a random copolymer or a block copolymer.

Specific examples of the propylene copolymer (B) can include a propylene-ethylene copolymer, a propylene-ethylene-1-butene copolymer, a propylene-ethylene-1-hexene copolymer, and a propylene-ethylene-1-octene copolymer. The propylene copolymer (B) is more preferably a propylene-ethylene copolymer or a propylene-ethylene-1-butene copolymer.

Mixing Ratios of Propylene Copolymer (A) and Propylene Copolymer (B)

As for mixing ratios of the propylene copolymer (A) and the propylene copolymer (B) in the heterophasic propylene polymer material, the content of the propylene copolymer (A) is 45 wt % to 65 wt %, and more preferably 47 wt % to 55 wt %, and the content of the propylene copolymer (B) is 35 wt % to 55 wt %, and more preferably 45 wt % to 53 wt %, with respect to the total of 100 wt % of the propylene copolymer (A) and the propylene copolymer (B), from the viewpoint of the appearance of the obtained molded article and the low-temperature impact resistance.

Crosslinking Agent

As the crosslinking agent used in the production method, an organic peroxide is preferably used. Examples of the organic peroxide can include ketone peroxides, diacyl peroxides, hydroperoxides, dialkyl peroxides, peroxyketals, peroxydicarbonates, and peroxyesters.

Examples of the ketone peroxides can include cyclohexane peroxide and methylcyclohexanone peroxide.

Examples of the diacyl peroxides can include isobutyryl peroxide and benzoyl peroxide.

Examples of the hydroperoxides can include 2,2,4-trimethylpentyl-2-hydroperoxide, diisopropylbenzo hydroperoxide, and cumene hydroperoxide.

Examples of the dialkyl peroxides can include dicumyl peroxide, 2,5-dimethyl-2,5-di(t-butylperoxy)hexane, 2,5-dimethyl-2,5-di(t-butylperoxy)hexyne-3, t-butyl cumyl peroxide, and di-t-butyl peroxide.

Examples of the peroxyketals can include 1,1-bis(t-butylperoxy)cyclohexane and n-butyl-4,4-bis(t-butylperoxy) valerate.

Examples of the peroxydicarbonates can include di-n-propyl peroxydicarbonate and di-2-ethoxyethyl peroxydicarbonate.

Examples of the peroxyesters can include cumyl peroxy neodecanoate, t-butyl peroxypivalate, and t-hexyl peroxybenzoate.

The organic peroxides can be used alone or in combination of two or more thereof.

The amount of the crosslinking agent is preferably 0.05 parts by weight to 1.0 part by weight, more preferably 0.10 parts by weight to 0.50 parts by weight, and still more preferably 0.20 parts by weight to 0.40 parts by weight, with respect to 100 parts by weight of the heterophasic propylene polymer material, from the viewpoint of the appearance of the obtained molded article.

When the amount of the crosslinking agent is too small, fluidity of the thermoplastic elastomer composition may not be sufficient or the appearance of the obtained molded article may not be excellent. When the amount of the crosslinking agent is too large, the low temperature impact performance or material strength of the obtained molded article may be reduced.

Crosslinking Aid

The crosslinking aid is for increasing the degree of crosslinking of the polymer that can be crosslinked to improve mechanical properties of the thermoplastic elastomer composition. A compound having a plurality of double bonds in a molecule is preferably used.

As the crosslinking aid, it is preferable to use at least one compound selected from the group consisting of a maleimide compound, a multi-functional vinyl compound, and a multi-functional acrylate compound.

Examples of the maleimide compound can include N,N'-m-phenylene bismaleimide and toluylene bismaleimide.

Examples of the multi-functional vinyl compound can include divinylbenzene, triallyl cyanurate, triallyl isocyanurate, and diallyl phthalate.

The multi-functional acrylate compound is an ester of a polyhydric alcohol and a (meth)acrylate, and examples thereof can include ethylene glycol di(meth)acrylate, polyethylene glycol di(meth) acrylate, trimethylolpropane tri(meth)acrylate, and allyl (meth)acrylate. In addition, as the crosslinking aid, a multi-functional urethane acrylate compound which is a reaction product between a multi-functional isocyanate compound such as hexamethylene diisocyanate (HDI) and (meth)acrylate having a hydroxyl group such as hydroxyethyl (meth)acrylate (HEMA) or an active hydrogen group such as an amino group may be used.

The organic peroxides can be used alone or in combination of two or more thereof.

The amount of the crosslinking aid is preferably 0.05 parts by weight to 1.0 part by weight, more preferably 0.10 parts by weight to 0.70 parts by weight, and still more preferably 0.20 parts by weight to 0.60 parts by weight, with respect to 100 parts by weight of the heterophasic propylene polymer material, from the viewpoint of the appearance of the obtained molded article.

When the amount of the crosslinking aid is too small, the appearance of the obtained molded article may not be excellent. When the amount of the crosslinking aid is too large, the fluidity of the thermoplastic elastomer composition may not be sufficient.

Other Components

The thermoplastic elastomer composition may further contain at least one release agent selected from the compound group consisting of a fatty acid having 5 or more carbon atoms, a metal salt of a fatty acid having 5 or more carbon atoms, an amide of a fatty acid having 5 or more carbon atoms, and an ester of a fatty acid having 5 or more carbon atoms, from the viewpoint of imparting the release property for the purpose of improving production stability in the injection molding.

Examples of the fatty acid having 5 or more carbon atoms can include lauric acid, palmitic acid, stearic acid, behenic acid, oleic acid, erucic acid, linoleic acid, and ricinoleic acid.

Examples of the metal salt of a fatty acid having 5 or more carbon atoms can include a salt of the fatty acid and a metal such as Li, Na, Mg, Al, K, Ca, Zn, Ba, and Pb, and specifically, lithium stearate, sodium stearate, calcium stearate, and zinc stearate.

Examples of the amide of a fatty acid having 5 or more carbon atoms can include lauramide, palmitamide, stearamide, oleamide, erucamide, methylenebisstearamide, ethylenebisstearamide, ethylenebisoleamide, and stearyldiethanolamide. Among them, erucamide is preferable.

An example of the ester of a fatty acid having 5 or more carbon atoms can include an ester of the following alcohol and the fatty acid.

Examples of the alcohol can include aliphatic alcohol such as myristyl alcohol, palmityl alcohol, stearyl alcohol, behenyl alcohol, or 12-hydroxystearyl alcohol; aromatic alcohol such as benzyl alcohol, β-phenylethyl alcohol, or phthalyl alcohol; polyhydric alcohol such as glycerin, diglycerin, polyglycerin, sorbitan, sorbitol, propylene glycol, polypropylene glycol, polyethylene glycol, pentaerythritol, or trimethylolpropane; and specifically, glycerin monooleate, glycerin dioleate, polyethylene glycol monostearate, and citrate distearate.

A content of the release agent is preferably 0.01 parts by weight to 1.5 parts by weight, more preferably 0.05 parts by weight to 1.0 part by weight, and still more preferably 0.10 parts by weight to 0.50 parts by weight, with respect to 100 parts by weight of the heterophasic propylene polymer material, from the viewpoint of a balance between the release property after the injection molding and the appearance of a surface of the molded article.

The thermoplastic elastomer composition may also contain an inorganic filler such as talc, calcium carbonate, calcined kaolin, or hydrotalcite, an organic filler such as fiber, wood flour, or cellulose powder, a lubricant such as silicone oil or silicone gum, an antioxidant, a weathering stabilizer, an ultraviolet absorber, a heat stabilizer, a light stabilizer, a pigment, a nucleating agent, or an adsorbent, within a range in which the effects of the present invention are not impaired.

Method of Producing Thermoplastic Elastomer Composition

A method of producing a thermoplastic elastomer composition according to an aspect of the present invention includes melting and kneading a heterophasic propylene polymer material in the presence of a crosslinking agent and a crosslinking aid.

Here, the producing of the heterophasic propylene polymer material and the producing of the thermoplastic elastomer composition do not necessarily need to be sequentially performed, but are preferably sequentially performed. That is, the method of producing a thermoplastic elastomer composition according to an aspect of the present invention can include a mode of obtaining a commercially available heterophasic propylene polymer material obtained by a production method described below, and melting and kneading the heterophasic propylene polymer material in the presence of a crosslinking agent and a crosslinking aid.

Production Method of Heterophasic Propylene Polymer Material

Examples of a production method of a heterophasic propylene polymer material can include the following production methods 1 and 2.

Production Method 1: Production Method of Heterophasic Propylene Polymer Material, Production Method Including Step (1-1) And Step (1-2)

Step (1-1): A step of copolymerizing propylene and at least one olefin selected from the group consisting of ethylene and α-olefin having 4 to 12 carbon atoms in the presence of a propylene polymerization catalyst by a multi-stage polymerization method to obtain a propylene copolymer (A)

Step (1-2): A step of copolymerizing propylene and at least one olefin selected from the group consisting of ethylene and α-olefin having 4 to 12 carbon atoms in the presence of the propylene copolymer (A) obtained in the above step by a multi-stage polymerization method to obtain a heterophasic propylene polymer material containing a propylene copolymer (A) and a propylene copolymer (B)

Production Method 2: Production Method of Heterophasic Propylene Polymer Material, Production Method Including Step (2-1) And Step (2-2)

Step (2-1): A step of copolymerizing propylene and at least one olefin selected from the group consisting of ethylene and α-olefin having 4 to 12 carbon atoms in the presence of a propylene polymerization catalyst by a multi-stage polymerization method to obtain a propylene copolymer (B)

Step (2-2): A step of copolymerizing propylene and at least one olefin selected from the group consisting of ethylene and α-olefin having 4 to 12 carbon atoms in the presence of the propylene copolymer (B) obtained in the above step by a multi-stage polymerization method to obtain a heterophasic propylene polymer material containing a propylene copolymer (A) and a propylene copolymer (B)

In the present invention, the multi-stage polymerization method is a polymerization method of polymerizing a monomer in the presence of a polymerization catalyst in a plurality of serially connected reaction regions. The polymerization method includes the following steps a to c.

Step a: A step of feeding a polymerization catalyst and a monomer to a first reaction region on the most upstream side and polymerizing the monomer to obtain a polymer Step b: A step of transferring the polymer obtained in the first reaction region to a second reaction region connected to the first reaction region Step c: A step of feeding a monomer to the second reaction region and polymerizing the monomer in the presence of the polymer obtained in the first reaction region to obtain a polymer When the number of the serially connected reaction regions is 3 or more, steps corresponding to the steps b and c are performed also in subsequent regions after a third reaction region.

Examples of the multi-stage polymerization includes: a case of performing a polymerization in a reaction apparatus in which a plurality of reactors having one reaction region on one reactor are serially connected, a case of performing a polymerization in a reactor having a plurality of reaction regions in one reactor; and a case of performing a polymerization in a reaction apparatus in which a reactor having one reaction region in one reactor and a reactor having a plurality of reaction regions in one reactor are connected.

An example of the reactor having a plurality of reaction regions in one reactor can include a multi-stage spouted bed type reactor.

In the multi-stage polymerization method, the number of reaction regions is not particularly limited. In the step (1-1) or (2-2) of the multi-stage polymerization method, the number of reaction regions is preferably 6 to 10. In the step (1-2) or (2-1) of the multi-stage polymerization method, the number of reaction regions is preferably 2 to 5.

It is preferable that the step (1-2) or (2-1) be performed under an atmosphere having a hydrogen concentration of more than 0.4 mol % and 10 mol % or less. The hydrogen concentration is more preferably 0.5 to 5.0 mol %.

In an embodiment of the present invention, a vessel type reactor can be used in the first stage of the multi-stage polymerization. A polymerization temperature can be 0 to 120° C. A polymerization pressure can be an atmospheric pressure to 10 MPaG.

Next, a gas phase reactor can be used in the second stage of the multi-stage polymerization. The polymerization temperature is preferably 40 to 80° C., and more preferably 40 to 75° C. The polymerization pressure is preferably an atmospheric pressure to 10 MPaG, and more preferably an atmospheric pressure to 2.0 MPaG.

Next, a gas phase reactor can be used in the third stage of the multi-stage polymerization. A polymerization temperature is preferably 0 to 120° C. The polymerization pressure is preferably an atmospheric pressure to 10 MPaG, and more preferably an atmospheric pressure to 2.0 MPaG. The hydrogen concentration is preferably 0.4 to 10 mol %.

Next, a gas phase reactor can be used in the fourth stage of the multi-stage polymerization. A polymerization temperature is preferably 0 to 120° C. The polymerization pressure is preferably an atmospheric pressure to 10 MPaG, and more preferably an atmospheric pressure to 2.0 MPaG. The hydrogen concentration is preferably 0.4 to 10 mol %.

In an embodiment of the present invention, an example of the propylene polymerization catalyst preferably used in the production method of the heterophasic propylene polymer material can include a propylene polymerization catalyst obtained by contacting a solid catalyst component and an organic aluminum compound.

In another embodiment of the present invention, an example of the propylene polymerization catalyst preferably used in the production method of the heterophasic propylene polymer material can include a propylene polymerization catalyst obtained by contacting a solid catalyst component, an organic aluminum compound, and an external electron donor.

As the solid catalyst component, a solid catalyst component containing at least one internal electron donor selected from the group consisting of a monoester compound, an aliphatic dicarboxylic acid ester compound, a diol diester compound, a β-alkoxy ester compound, and a diether compound, a titanium atom, a magnesium atom, and a halogen atom, and satisfying the following requirements (i) to (iv) can be preferably used.

(i) A total pore volume measured by a mercury intrusion method according to the standard ISO 15901-1:2005 is 0.95 to 1.80 mL/g, and a specific surface area measured by a mercury intrusion method according to the standard ISO15901-1:2005 is 60 to 170 m²/g.

(ii) A cumulative percentage of components having a particle size of 10 μm or less in a volume-based particle size distribution measured by a laser diffraction scattering method according to the standard ISO13320:2009 is 6.5% or less.

(iii) Among peak components obtained by waveform separation of peaks belonging to a 1s-orbit of an oxygen atom obtained by X-ray photoelectron spectroscopy (XPS) according to the standard ISO15472:2001, a ratio (G/F) of an area (G) of peak components having a peak top in a range of 529 eV or more and less than 532 eV of binding energy to an area (F) of peak components having a peak top in a range of 532 eV or more and 534 eV or less of binding energy is 0.33 or less.

(iv) A content of the titanium atom is 1.50 to 3.40 wt %.

Such a solid catalyst component can be produced, for example, by a method of producing a solid catalyst component, the method including: contacting a halogenated titanium compound solution containing a halogenated titanium compound and a solvent with a magnesium compound to obtain a slurry containing a solid product. In the step, a ratio of A represented by the following Equation (1) to C represented by the following Equation (2) (A/C) is 3 or less.

$$A = a/b \quad (1)$$

$$C = a/c \quad (2)$$

a: A volume (mL) of the halogenated titanium compound contained in the halogenated titanium compound solution b: A volume (mL) of a solvent contained in the halogenated titanium compound solution c: A volume (mL) of the solvent contained in the slurry containing a solid product As the monoester compound used as the internal electron donor, an aromatic carboxylic acid ester compound and an aliphatic carboxylic acid ester compound are preferable. Examples of the aromatic carboxylic acid ester compound can include methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, and octyl toluate. Examples of the aliphatic carboxylic acid ester compound can include methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, oczyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methyl margarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, and octyl stearate.

Examples of the aliphatic dicarboxylic acid ester compound used as the internal electron donor can include dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enedioate, diethyl (E)-but-2-enedioate, dipropyl (E)-but-2-enedioate, dibutyl (E)-but-2-enedioate, dipentyl (E)-but-2-enedioate, dihexyl (E)-but-2-enedioate, dioctyl (E)-but-2-enedioate, dimethyl (Z)-but-2-enedioate, diethyl (Z)-but-2-enedioate, dipropyl (Z)-but-2-enedioate, dibutyl (Z)-but-2-enedioate, dipentyl (Z)-but-2-enedioate, dihexyl (Z)-but-2-enedioate, dioctyl (Z)-but-2-enedioate, dimethyl cyclohexane-1,2-dicarboxylate, diethyl cyclohexane-1,2-dicarboxylate, dipropyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, dioctyl cyclohexane-1,2-dicarboxylate, dimethyl 1,2-cyclohexene-1,2-dicarboxylate, diethyl 1,2-cyclohexene-1,2-dicarboxylate, dipropyl 1,2-cyclohexene-1,2-dicarboxylate, dibutyl 1,2-cyclohexene-1,2-dicarboxylate, dipentyl 1,2-cyclohexene-1,2-dicarboxylate, dihexyl 1,2-cyclohexene-1,2-dicarboxylate, dioctyl 1,2-cyclohexene-1,2-dicarboxylate, dimethyl 3-methylcyclohexane-1,2-dicarboxylate, diethyl 3-methylcyclohexane-1,2-dicarboxylate, dipropyl 3-methylcyclohexane-1,2-dicarboxylate, dibutyl 3-methylcyclohexane-1,2-dicarboxylate, dipentyl 3-methylcyclohexane-1,2-dicarboxylate, dihexyl 3-methylcyclohexane-1,2-dicarboxylate, dioctyl 3-methylcyclohexane-1,2-dicarboxylate, dimethyl 3,6-dimethylcyclohexane-1,2-dicarboxylate, diethyl 3,6-dimethylcyclohexane-1,2-dicarboxylate, dipropyl 3,6-dimethylcyclohexane-1,2-dicarboxylate, dibutyl 3,6-dimethylcyclohexane-1,2-dicarboxylate, dipentyl 3,6-dimethylcyclohexane-1,2-dicarboxylate, dihexyl 3,6-dimethylcyclohexane-1,2-dicarboxylate, and dioctyl 3,6-dimethylcyclohexane-1,2-dicarboxylate.

Examples of the diol diester compound used as the internal electron donor can include 1,2-dibenzoate propane, 1,2-diacetyloxypropane, 1,2-dibenzoate butane, 1,2-diacetyloxybutane, 1,2-dibenzoate cyclohexane, 1,2-diacetyloxycyclohexane, 1,3-dibenzoate propane, 1,3-diacetyloxypropane, 2,4-dibenzoate pentane, 2,4-diacetyloxypentane, 1,2-dibenzoate cyclopentane, 1,2-diacetyloxycyclopentane, 1,2-dibenzoate-4-tert-butyl-6-methylbenzene, 1,2-diacetyloxy-4-tert-butyl-6-methylbenzene, 1,3-dibenzoate 4-tert-butyl-6-methylbenzene, and 1,3-diacetyloxy-4-tert-butyl-6-methylbenzene.

Examples of the β-alkoxy ester compound used as the internal electron donor can include methyl 2-methoxymethyl-3,3-dimethylbutanoate, ethyl 2-methoxymethyl-3,3-dimethylbutanoate, propyl 2-methoxymethyl-3,3-dimethylbutanoate, butyl 2-methoxymethyl-3,3-dimethylbutanoate, pentyl 2-methoxymethyl-3,3-dimethylbutanoate, hexyl 2-methoxymethyl-3,3-dimethylbutanoate, octyl 2-methoxymethyl-3,3-dimethylbutanoate, methyl 3-methoxy-2-phenylpropionate, ethyl 3-methoxy-2-phenylpropionate, propyl 3-methoxy-2-phenylpropionate, butyl 3-methoxy-2-phenylpropionate, pentyl 3-methoxy-2-phenylpropionate, hexyl 3-methoxy-2-phenylpropionate, octyl 3-methoxy-2-phenylpropionate, methyl 2-ethoxymethyl-3,3-dimethylbutanoate, ethyl 2-ethoxymethyl-3,3-dimethylbutanoate, propyl 2-ethoxymethyl-3,3-dimethylbutanoate, butyl 2-ethoxymethyl-3,3-dimethylbutanoate, pentyl 2-ethoxymethyl-3,3-dimethylbutanoate, hexyl 2-ethoxymethyl-3,3-dimethylbutanoate, octyl 2-ethoxymethyl-3,3-dimethylbutanoate, methyl 3-ethoxy-2-phenylpropionate, ethyl 3-ethoxy-2-phenylpropionate, propyl 3-ethoxy-2-phenylpropionate, butyl 3-ethoxy-2-phenylpropionate, pentyl 3-ethoxy-2-phenylpropionate, hexyl 3-ethoxy-2-phenylpropionate, octyl 3-ethoxy-2-phenylpropionate, methyl 2-propyloxymethyl-3,3-dimethylbutanoate, ethyl 2-propyloxymethyl-3,3-dimethylbutanoate, propyl 2-propyloxymethyl-3,3-dimethylbutanoate, butyl 2-propyloxymethyl-3,3-dimethylbutanoate, pentyl 2-propyloxymethyl-3,3-dimethylbutanoate, hexyl 2-propyloxymethyl-3,3-dimethylbutanoate, octyl 2-propyloxymethyl-3,3-dimethylbutanoate, methyl 3-propyloxy-2-phenylpropionate, ethyl 3-propyloxy-2-phenylpropionate, propyl 3-propyloxy-2-phenylpropionate, butyl 3-propyloxy-2-phenylpropionate, pentyl 3-propyloxy-2-phenylpropionate, hexyl 3-propyloxy-2-phenylpropionate, octyl 3-propyloxy-2-phenylpropionate, methyl 2-methoxybenzenecarboxylate, ethyl 2-methoxybenzenecarboxylate, propyl 2-methoxybenzenecarboxylate, butyl 2-methoxybenzenecarboxylate, pentyl 2-methoxybenzenecarboxylate, hexyl 2-methoxybenzenecarboxylate, octyl 2-methoxybenzenecarboxylate, methyl 2-ethoxybenzenecarboxylate, ethyl 2-ethoxybenzenecarboxylate, propyl 2-ethoxybenzenecarboxylate, butyl 2-ethoxybenzenecarboxylate, pentyl 2-ethoxybenzenecarboxylate, hexyl 2-ethoxybenzenecarboxylate, and octyl 2-ethoxybenzenecarboxylate.

Examples of the diether compound used as the internal electron donor can include 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-dimethoxybutane, 1,2-diethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane, 1,2-diethoxycyclohexane, 1,2-dipropyloxycyclohexane, 1,2-dibutoxycyclohexane, 1,2-di-tert-butoxycyclohexane, 1,2-diphenoxycyclohexane, 1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl)fluorene, 9,9-bis(ethoxymethyl)fluorene, 9,9-bis(propyloxymethyl)fluorene, 9,9-bis(butoxymethyl)fluorene, 9,9-bis-tert-butoxymethylfluorene, 9,9-bis(phenoxymethyl)fluorene, 9,9-bis(benzyloxymethyl)fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene, and 1,2-dibenzyloxybenzene.

In addition, internal electron donors described in JP-A-2011-246699 can also be applied.

The internal electron donor is preferably a dicarboxylic acid ester compound, a diol diester compound, and a β-alkoxy ester compound. These internal electron donors may be independently used alone or in combination of two or more thereof.

An example of the organic aluminum compound can include compounds described in JP-A-10-212319. Among them, trialkylaluminum, a mixture of trialkylaluminum and dialkylaluminum halide, or alkylalumoxane is preferable, and triethylaluminum, triisobutylaluminum, a mixture of triethylaluminum and diethylaluminum chloride, or tetraethyldialumoxane is more preferable.

Examples of the external electron donor can include compounds described in Japanese Patent No. 2950168, JP-A-2006-96936, JP-A-2009-173870, and JP-A-2010-168545. Among them, an oxygen-containing compound or a nitrogen-containing is preferable. Examples of the oxygen-containing compound can include alkoxysilicon, ether, ester, and ketone. Among them, alkoxysilicon or ether is preferable, and examples thereof can include cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, iso-butyltriethoxysilane, vinyltriethoxysilane, sec-butyltriethoxysilane, cyclohexyltriethoxysilane, and cyclopentyltriethoxysilane.

As the solvent used in the method of producing a solid catalyst component, inactive hydrocarbons such as propane, butane, isobutane, pentane, isopentane, hexane, heptane, octane, cyclohexane, benzene, and toluene are preferable.

The production method of the heterophasic propylene polymer material of the present invention may further include polymerizing a small amount of olefin in the presence of a solid catalyst component and an organic aluminum compound to generate a catalyst component having a surface covered with an olefin polymer (the polymerization is usually called a preliminary polymerization; hence, the catalyst component is usually called a preliminary polymerization catalyst component). The olefin used in the preliminary polymerization is at least one of olefins used as a raw material of the heterophasic propylene polymer material in the polymerization. In the preliminary polymerization, in order to adjust a molecular weight of the olefin polymer to be generated, a chain transfer agent such as hydrogen may be used, or an external electron donor may be used.

In an aspect of the present invention, in the preliminary polymerization, the amount of the organic aluminum compound is preferably 0.1 to 700 mol, and more preferably 0.2 to 200 mol, per 1 mole of a transition metal atom contained in the solid catalyst component. In addition, the amount of the external electron donor is preferably 0.01 to 400 mol per 1 mole of the transition metal atom contained in the solid catalyst component. The amount of the solid catalyst component contained per 1 L of a solvent is preferably 1 to 500 g. The amount of olefin to be preliminarily polymerized is usually 0.1 to 200 g per 1 g of the solid catalyst component.

Melting and Kneading

The thermoplastic elastomer composition according to an embodiment of the present invention can be produced by the method of producing a thermoplastic elastomer composition, the method including melting and kneading the heterophasic propylene polymer material in the presence of a crosslinking agent and a crosslinking aid.

By melting and kneading the heterophasic propylene polymer material in the presence of the crosslinking agent and the crosslinking aid, a monomer unit derived from at least one monomer selected from the group consisting of ethylene and α-olefin having 4 to 12 carbon atoms in the propylene copolymer acts as a crosslinkable monomer unit to form a crosslinked structure. Therefore, the thermoplastic elastomer composition contains at least a non-crosslinked propylene copolymer (A) having a chain structure and a crosslinked propylene copolymer (B) containing many crosslinkable monomer units. The thermoplastic elastomer composition may further contain a crosslinked propylene copolymer (A) and a non-crosslinked propylene copolymer (B). It is preferable that the thermoplastic elastomer composition contain a non-crosslinked propylene copolymer (A), a crosslinked propylene copolymer (B), and a non-crosslinked propylene copolymer (B).

The crosslinking agent and the crosslinking aid may be separately added to the heterophasic propylene polymer material or may be added at the same time. Either the crosslinking agent or the crosslinking aid may be added first. For example, the heterophasic propylene polymer material may be fed on an upstream side of an extruder, and the crosslinking agent and/or the crosslinking aid may be fed at the same position as the feeding position or on a downstream side from the feeding position.

A temperature at which the melting and kneading is performed varies depending on the types of a crosslinking agent and a crosslinking aid to be added. However, a temperature at which each of the components after the melting and kneading can be sufficiently crosslinked is preferable, for example, 170° C. to 270° C., and more preferably 180 to 250° C.

A period of time for which the melting and kneading is performed varies depending on the types of a crosslinking agent and a crosslinking aid to be added. However, a period of time for which each of the components after the melting and kneading can be sufficiently crosslinked is preferable, for example, 0.1 to 5.0 minutes, and more preferably 0.3 to 2.0 minutes.

Injection Molding

A molding temperature at the time of the injection molding is generally 150° C. to 300° C., preferably 180° C. to 280° C., and more preferably 200° C. to 250° C. A temperature of a mold is generally 0° C. to 100° C., preferably 20° C. to 90° C., more preferably 40° C. to 80° C., and still more preferably 50° C. to 75° C.

EXAMPLES

Reference Example 1: Production of Solid Catalyst Component

Step (1-1): A 100 mL flask equipped with a stirrer, a dropping funnel, and a thermometer was purged with nitrogen, 36.0 mL of toluene and 22.5 mL of titanium tetrachloride were added into the flask, and then stirring was performed, thereby obtaining a titanium tetrachloride solution. The temperature in the flask was adjusted to 0° C., 1.88 g of magnesium diethoxide was added at the same temperature four times every 30 minutes, and then stirring was performed at 0° C. for 1.5 hours. Then, 0.60 mL of ethyl 2-ethoxymethyl-3,3-dimethylbutanoate was added into the flask, and then the temperature in the flask was raised to 10° C. Thereafter, stirring was performed at the same temperature for 2 hours, and then 9.8 mL of toluene was added. Then, the temperature in the flask was raised, 3.15 mL of ethyl 2-ethoxymethyl-3,3-dimethylbutanoate was added into the flask at 60° C., and then the temperature was raised to 110° C. The mixture in the flask was stirred at the same temperature for 3 hours.

The obtained mixture was subjected to solid-liquid separation to obtain a solid. The obtained solid was washed with 56.3 mL of toluene at 100° C. three times.

Step (1-2): 38.3 mL of toluene was added to the washed solid obtained in the step (1-1) to prepare a slurry. To the slurry, 15.0 mL of titanium tetrachloride and 0.75 mL of ethyl 2-ethoxymethyl-3,3-dimethylbutanoate were added to prepare a mixture, and then the mixture was stirred at 110° C. for 1 hour. Then, the stirred mixture was subjected to solid-liquid separation, the obtained solid was washed with 56.3 mL of toluene at 60° C. three times and further washed with 56.3 mL of hexane at room temperature three times, and then the washed solid was dried under a reduced pressure, thereby obtaining a solid catalyst component.

In the solid catalyst component, a content of a titanium atom was 2.53 wt %, a content of an ethoxy group was 0.44 wt %, and a content of an internal electron donor was 13.7 wt %.

Further, a central particle size measured by a laser diffraction scattering method was 59.5 μm, and a cumulative percentage of components having a particle size of 10 μm or less in a volume-based particle size distribution was 5.3%.

The amount of peak components derived from a is-orbit of an oxygen atom obtained by XPS and having a peak top of binding energy in a range of 532 to 534 eV was 85.0%, and the amount of the peak components having a peak top of the binding energy in a range of 529 eV or more and less than 532 eV was 15.0%.

The total pore volume measured by a mercury intrusion method was 1.43 mL/g, the total volume of pores having a pore radius in a range of 5 to 30 nm was 0.160 mL/g, the total volume of pores having a pore radius in a range of 30 to 700 nm was 0.317 mL/g, and a specific surface area was 107.44 m$^2$/g.

Reference Example 2: Production of Heterophasic Propylene Polymer Material-1

(2-1) Preliminary Polymerization

An SUS autoclave having an internal volume of 3 L equipped with a stirrer was charged with 1.0 L of sufficiently dehydrated and deaerated n-hexane, 20 mmol of triethylaluminum (hereinafter, described as a "TEA"), and 2.0 mmol of t-butyl-n-propyldimethoxysilane (electron donor component). Into the SUS autoclave, 6 g of the solid catalyst component produced in Reference Example 1 was added, and 6 g of propylene was sequentially fed over a period of about 30 minutes while keeping the temperature in the autoclave at about 10° C., thereby performing a preliminary polymerization. Thereafter, the slurry subjected to the preliminary polymerization was transferred to an SUS316L autoclave having an internal volume of 150 L equipped with a stirrer, and 100 L of liquid butane was added thereto, thereby obtaining a slurry of a preliminary polymerization catalyst component.

(2-2) Main Polymerization

In a reaction apparatus in which a slurry polymerization reactor and three gas phase reactors are serially disposed, a propylene copolymer (A-1) was produced in the following polymerization steps (2-2-1) and (2-2-2), and transferred to the subsequent stage without deactivating the produced propylene copolymer (A-1), and then a propylene copolymer (B-1) was produced in the following polymerization steps (2-2-3) and (2-2-4).

Polymerization Step (2-2-1)

Copolymerization of propylene and ethylene was performed using an SUS304 vessel type reactor equipped with a stirrer. That is, propylene, ethylene, hydrogen, triethylaluminum, t-butyl-n-propyldimethoxysilane, and the slurry of the preliminary polymerization catalyst component produced in (2-1) were sequentially fed to the reactor, and then the polymerization reaction was performed. The reaction conditions were as follows.

Polymerization temperature: 50° C.
Stirring rate: 150 rpm
Liquid level of reactor: 18 L
Feeding amount of propylene: 20.0 kg/hr
Feeding amount of ethylene: 0.03 kg/hr
Feeding amount of hydrogen: 24.0 NL/hr
Feeding amount of triethylaluminum: 37.2 mmol/hr
Feeding amount of t-butyl-n-propyldimethoxysilane: 7.90 mmol/hr
Feeding amount of slurry of preliminary polymerization catalyst component (in terms of polymerization catalyst component): 0.42 g/hr
Polymerization pressure: 3.50 MPa (gauge pressure)

Polymerization Step (2-2-2)

A multi-stage gas phase polymerization reactor having 6-stage reaction regions in a vertical direction in which the top stage is a fluidized bed and the remaining 5 stages are spouted beds was prepared.

A slurry containing polypropylene copolymer particles and liquid propylene copolymers was sequentially fed from the vessel type reactor in the polymerization step (2-2-1) to the fluidized bed which is located at the top stage of the multi-stage gas phase polymerization reactor without deactivation.

The inter-stage transfer of polypropylene particles in the multi-stage gas phase polymerization reactor was performed in a double valve manner. In this transfer method, a reaction region of an upper stage and a reaction region of a lower stage are connected by a pipe of 1 inch, two on-off valves are provided in the pipe, an upper valve is opened in a state in which a lower valve is closed, the powder is accumulated between the valves from the reaction region of the upper stage, and then the lower valve is opened after closing the upper valve, thereby transferring the polypropylene particles to the reaction region of the lower stage.

Propylene, ethylene, and hydrogen were sequentially fed from a lower part of the multi-stage gas phase polymerization reactor having the above-described configuration. By doing so, the fluidized bed or the spouted bed was formed in each reaction region, the feeding amounts of propylene, ethylene, and hydrogen were controlled so as to keep a gas composition and a pressure constant, and a copolymerization of propylene and ethylene was further performed while purging the excess gas, thereby producing a propylene copolymer (A-1). The reaction conditions were as follows.

Polymerization temperature: 65° C.
Polymerization pressure: 1.70 MPa (gauge pressure)

In the multi-stage gas phase polymerization reactor, a gas concentration ratio (ethylene/(propylene+ethylene)) in the reactor was 1.40 mol %, and a gas concentration ratio (hydrogen/(hydrogen+propylene+ethylene)) in the reactor was 5.60 mol %.

Polymerization Step (2-2-3)

The particles of the propylene copolymer (A-1) discharged from the multi-stage gas phase polymerization reactor in the polymerization step (2-2-2) were sequentially fed to a fluidized bed type reactor. The fluidized bed type reactor includes a gas dispersion plate, and the transfer of the particles of the propylene copolymer (A-1) from the multi-stage gas phase polymerization reactor of the former stage to the fluidized bed type reactor was performed in the double valve manner.

Propylene, ethylene, and hydrogen were sequentially fed to the fluidized bed type reactor having the above-described configuration, and then a copolymerization of propylene and ethylene was performed in the presence of the particles of the propylene copolymer (A-1) while adjusting the gas feeding amount and purging the excess gas so as to keep the gas composition and the pressure constant. The reaction conditions were as follows.

Polymerization temperature: 70° C.
Polymerization pressure: 1.60 MPa (gauge pressure)

In the fluidized bed type reactor, a gas concentration ratio (ethylene/(propylene+ethylene)) in the reactor was 45.9 mol %, and a gas concentration ratio (hydrogen/(hydrogen+propylene+ethylene)) in the reactor was 3.10 mol %.

Polymerization Step (2-2-4)

The particles of the polypropylene copolymer discharged from the fluidized bed type reactor in the polymerization step (2-2-3) were further sequentially fed to a fluidized bed type reactor of the subsequent stage. Similarly to the fluidized bed type reactor in the polymerization step (2-2-3), the fluidized bed type reactor in the polymerization step (2-2-4) includes a gas dispersion plate, and the transfer of the particles of the polypropylene copolymer from the fluidized bed type reactor in the polymerization step (2-2-3) to the fluidized bed type reactor in the polymerization step (2-2-4) was performed in the double valve manner.

Copolymerization of propylene and ethylene was performed to obtain a heterophasic propylene polymer material-1 containing a propylene copolymer (A-1) and a propylene copolymer (B-1), in the same manner as that in the polymerization step (2-2-3) except for the following conditions.

Polymerization temperature: 70° C.
Polymerization pressure: 1.40 MPa (gauge pressure)

In the fluidized bed type reactor, a gas concentration ratio (ethylene/(propylene+ethylene)) in the reactor was 46.0 mol %, and a gas concentration ratio (hydrogen/(hydrogen+propylene+ethylene)) in the reactor was 3.20 mol %.

(2-3) Contents of Propylene Copolymer (A-1) and Propylene Copolymer (B-1)

A content ratio ($X_{A-1}$) of the propylene copolymer (A-1) and a content ratio ($X_{B-1}$) of the propylene copolymer (B-1) each in the obtained heterophasic propylene polymer material-1 were obtained by measuring a heat of fusion of crystals of the propylene copolymer (A-1) and the total heterophasic propylene polymer material-1 and performing calculation using the following equations. The heat of fusion of the crystals was measured by differential scanning calorimetry (DSC).

In the condition of the differential scanning calorimetry (DSC), first, as a $1^{st}$ run (first scanning), a temperature was raised from 50° C. to 220° C. at 200° C./min and held at 220° C. for 5 minutes. Then, the temperature was lowered from 220° C. to 180° C. at 70° C./min and held at 180° C. for 1 minute. Then, the temperature was lowered from 180° C. to 50° C. at 150° C./min and held at 50° C. for 2 minutes (temperature lowering step). Then, as a $2^{nd}$ run (second scanning), the temperature was raised from 50° C. to 185° C. at 16° C./min. An endothermic peak of the heterophasic propylene polymer material-1 or the propylene copolymer (A-1) at the time of the $2^{nd}$ run was measured, and the following $(\Delta Hf)_T$ and $(\Delta Hf)_{A-1}$ were obtained from the obtained peak area. It should be noted that the amount of a sample used in the differential scanning calorimetry (DSC) per one time is about 5 mg.

$$X_{A-1}=(\Delta Hf)_T/(\Delta Hf)_{A-1}$$

$$X_{B-1}=1-(\Delta Hf)_T/(\Delta Hf)_{A-1}$$

$(\Delta Hf)_T$: Heat of fusion (J/g) of propylene copolymer (A-1) contained in total heterophasic propylene polymer material-1

$(\Delta Hf)_{A-1}$: Heat of fusion (J/g) of propylene copolymer (A-1)

In the differential scanning calorimetry (DSC) under the above conditions, the endothermic peak of the propylene copolymer (B-1) was not substantially shown. Therefore, the peak area for obtaining $(\Delta Hf)_T$ corresponds to a peak area derived from the propylene copolymer (A-1) contained in the heterophasic propylene polymer material-1. Therefore, $(\Delta Hf)_T$ corresponds to the heat of fusion of the propylene copolymer (A-1) contained in the heterophasic propylene polymer material-1, the heat of fusion of the propylene copolymer (A-1) being obtained by measuring the heat of fusion of the total heterophasic propylene polymer material-1.

The content of the propylene copolymer (A-1) was 50.4 wt %, and the content of the propylene copolymer (B-1) was 49.6 wt %, with respect to the total of 100 wt % of the propylene copolymer (A-1) and the propylene copolymer (B-1), the content being measured based on the content ratio $(X_{A-1})$ of the propylene copolymer (A-1) and the content ratio $(X_{B-1})$ of the propylene copolymer (B-1).

(2-4) Content $(Y_{A-1})$ of Monomer Unit Derived From Ethylene in Propylene Copolymer (A-1)

From an infrared absorption spectrum of the propylene copolymer (A-1) obtained in the polymerization steps (2-2-1) and (2-2-2-) by an FT-IR5200 (manufactured by JASCO Corporation), a content $(Y_{A-1})$ of a monomer unit derived from ethylene in the propylene copolymer (A-1) was obtained using the following equations.

$Y_A$-1 was quantified according to a method described in Polymer Analysis Handbook (written by Research Committee of Polymer Analysis of the Japan Society for Analytical Chemistry, issued by KINOKUNIYA COMPANY LTD.).

1) From a density (p (g/cm³)) and a thickness (t (cm)) of a measuring sample of an infrared absorption spectrum, an absorbance $A'_{732}$ in a wave number of 732 cm$^{-1}$, and an absorbance $A'_{718}$ in a wave number of 718 cm$^{-1}$, an apparent absorption coefficient $(K'_{732})_a$ in the wave number of 732 cm$^{-1}$, and an apparent absorption coefficient $(K'_{718})_a$ in the wave number of 718 cm$^{-1}$ were calculated by the following equations. The density of the measuring sample of the infrared absorption spectrum was 0.9 g/cm³. In addition, the thickness of the measuring sample of the infrared absorption spectrum measured with a commercially available digital thickness meter (contact type thickness meter, trade name: Ultra-High Precision DegiMicro Head MH-15M, manufactured by Nippon Kogaku, K.K.) was 0.02 cm.

$$(K'_{732})_a=A'_{732}/(\rho t)$$

$$(K'_{718})_a=A'_{718}/(\rho t)$$

2) An absorption coefficient $(K'_{732})_c$ after correction in the wave number of 732 cm$^{-1}$ and an absorption coefficient $(K'_{718})_c$ after correction in the wave number of 718 cm$^{-1}$ were calculated by the following equations.

$$(K'_{732})_c=1/0.96\{(K'_{732})_a-0.268(K'_{718})_a\}$$

$$(K'_{718})_c=1/0.96\{(K'_{718})_a-0.150(K'_{718})_a\}$$

3) $Y_{A-1}$ (wt %) was calculated by the following equation.

$$Y_{A-1}=0.575\{(K'_{722})_c+(K'_{736})_c\}$$

The content $(Y_{A-1})$ of the monomer unit derived from ethylene with respect to the total of 100 wt % of the monomer unit derived from propylene and the monomer unit derived from ethylene was 1.8 wt %.

(2-5) Content $(Y_{B-1})$ of Monomer Unit Derived From Ethylene in Propylene Copolymer (B-1)

A content $(Y_{B-1})$ of a monomer unit derived from ethylene in the propylene copolymer (B-1) was obtained by measuring a content (T-C2') of a monomer unit derived from ethylene in the heterophasic propylene polymer material-1 by an infrared absorption spectrum (FT-IR5200 (manufactured by JASCO Corporation)) of the obtained heterophasic propylene polymer material, and performing calculation using the following equation.

$$Y_{B-1}=(T-C2'-(Y_{A-1}\times X_{A-1}))/X_{B-1}\text{(wt \%)}$$

T-C2' was quantified according to a method described in Polymer Analysis Handbook (written by Research Committee of Polymer Analysis of the Japan Society for Analytical Chemistry, issued by KINOKUNIYA COMPANY LTD.).

From a density ($\rho$(g/cm³)) and a thickness (t(cm)) of a measuring sample of an infrared absorption spectrum, an absorbance $A'_{736}$ in a wave number of 736 cm$^{-1}$, and an absorbance $A'_{722}$ in a wave number of 722 cm$^{-1}$, an apparent absorption coefficient $(K'_{736})_a$ in the wave number of 736 cm$^{-1}$, and an apparent absorption coefficient $(K'_{722})_a$ in the wave number of 722 cm$^{-1}$ were calculated by the following equations. The density of the measuring sample of the infrared absorption spectrum was 0.9 g/cm³. In addition, the thickness of the measuring sample of the infrared absorption spectrum measured with a commercially available digital thickness meter (contact type thickness meter, trade name: Ultra-High Precision DegiMicro Head MH-15M, manufactured by Nippon Kogaku, K.K.) was 0.02 cm.

$$(K'_{736})_a=A'_{736}/(\rho t)$$

$$(K'_{722})_a=A'_{722}/(\rho t)$$

2) An absorption coefficient $(K'_{736})_c$ after correction in the wave number of 736 cm$^{-1}$ and an absorption coefficient $(K'_{722})_c$ after correction in the wave number of 722 cm$^{-1}$ were calculated by the following equations.

$$(K'_{736})_c=1/0.96\{(K'_{736})_a-0.268(K'_{722})_a\}$$

$$(K'_{722})_c=1/0.96\{(K'_{722})_a-0.150(K'736)_a\}$$

3) T-C2' (wt %) was calculated by the following equation.

$$T-C2'=0.575\{(K'_{722})_c+(K'_{736})_c\}$$

The content $(Y_{B-1})$ of the monomer unit derived from ethylene with respect to the total of 100 wt % of the monomer unit derived from propylene and the monomer unit derived from ethylene was 42.1 wt %.

(2-6) Weight Average Molecular Weights of Propylene Copolymer (A-1) and Propylene Copolymer (B-1)

Weight average molecular weights of the propylene copolymer (A-1) and the propylene copolymer (B-1) were obtained according to the measurement conditions using a CFC and a measurement procedure described below.

The weight average molecular weight of the propylene copolymer (A-1) was $5.1 \times 10^5$, and the weight average molecular weight of the propylene copolymer (B-1) was $8.7 \times 10^5$.

Reference Example 3: Production of Heterophasic Propylene Polymer Material-2

A heterophasic propylene polymer material-2 containing a propylene copolymer (A-2) and a propylene copolymer (B-2) was produced in the same manner as that of the heterophasic propylene polymer material-1 except that values shown in Table 1 were used.

In the heterophasic propylene polymer material-2, a content ($X_{A-2}$) of the propylene copolymer (A-2) was 47.1 wt %, and a content ($X_{B-2}$) of the propylene copolymer (B-2) was 52.9 wt %, with respect to the total of 100 wt % of the propylene copolymer (A-2) and the propylene copolymer (B-2).

In addition, in the propylene copolymer (A-2), a content ($Y_{A-2}$) of a monomer unit derived from ethylene was 0.0 wt % with respect to a total of 100 wt % of a monomer unit derived from propylene and the monomer unit derived from ethylene.

In addition, in the propylene copolymer (B-2), a content ($Y_{B-2}$) of a monomer unit derived from ethylene was 47.0 wt % with respect to a total of 100 wt % of a monomer unit derived from propylene and the monomer unit derived from ethylene.

In addition, the weight average molecular weight of the propylene copolymer (A-2) was $4.6 \times 10^5$, and the weight average molecular weight of the propylene copolymer (B-2) was $9.2 \times 10^5$.

TABLE 1

|  |  |  |  | Heterophasic propylene polymer material-1 | Heterophasic propylene polymer material-2 |
|---|---|---|---|---|---|
| (2-1) Preliminary polymerization |  | TEA concentration | mmol/L | 20 | 35 |
|  |  | Electron donor component concentration/TEA concentration | ratio | 0.1 | 0.1 |
|  |  | Solid catalyst component concentration | g/L | 6 | 9 |
|  |  | Temperature | ° C. | 10 | 10 |
|  |  | Propylene/Solid catalyst component | g/g | 1 | 1 |
| (2-2) |  |  | Propylene copolymer (A) | | |
| Polymerization | Polymerization step (2-2-1) | Polymerization temperature | ° C. | 50 | 50 |
|  |  | Polymerization pressure | MPaG | 3.50 | 3.60 |
|  |  | Feeding amount of propylene | kg/hr | 20.0 | 20.0 |
|  |  | Feeding amount of hydrogen | NL/hr | 24.0 | 42.0 |
|  |  | Feeding amount of ehylene | kg/hr | 0.03 | 0 |
|  |  | Feeding amount of TEA | mmol/hr | 37.2 | 44.7 |
|  |  | Feeding amount of electron donor component | mmol/hr | 7.90 | 8.10 |
|  |  | Feeding amount of solid catalyst component | g/hr | 0.42 | 0.65 |
|  | Polymerization step (2-2-2) | Polymerization temperature | ° C. | 65 | 70 |
|  |  | Polymerization pressure | MPaG | 1.70 | 1.70 |
|  |  | Hydrogen concentration *1 | mol % | 5.60 | 7.90 |
|  |  | Ethylene concentration *2 | mol % | 1.40 | 0.0 |
|  |  |  | Propylene copolymer (B) | | |
|  | Polymerization step (2-2-3) | Polymerization temperature | ° C. | 70 | 70 |
|  |  | Polymerization pressure | MPaG | 1.60 | 1.66 |

TABLE 1-continued

|  |  |  | Heterophasic propylene polymer material-1 | Heterophasic propylene polymer material-2 |
|---|---|---|---|---|
|  | Hydrogen concentration *1 | mol % | 3.10 | 3.40 |
|  | Ethylene concentration *2 | mol % | 45.9 | 48.0 |
| Polymerization step (2-2-4) | Polymerization temperature | °C. | 70 | 70 |
|  | Polymerization pressure | MPaG | 1.40 | 1.61 |
|  | Hydrogen concentration *1 | mol % | 3.20 | 3.30 |
|  | Ethylene concentration *2 | mol % | 46.0 | 47.9 |

*1 Hydrogen/(Hydrogen + Propylene + Ethylene)
*2 Ethylene/(Propylene + Ethylene)

Used Materials

In Examples and Comparative Examples, the following materials were used.

(1) Heterophasic Propylene Polymer Material-1
Content of propylene copolymer (A-1): 50.4 wt %
Content of propylene copolymer (B-1): 49.6 wt %
Content of monomer unit derived from ethylene in propylene copolymer (A-1): 1.8 wt %
Content of monomer unit derived from ethylene in propylene copolymer (B-1): 42.1 wt %

(2) Heterophasic Propylene Polymer Material-2
Content of propylene copolymer (A-2): 47.1 wt %
Content of propylene copolymer (B-2): 52.9 wt %
Content of monomer unit derived from ethylene in propylene copolymer (A-2): 0.0 wt %
Content of monomer unit derived from ethylene in propylene copolymer (B-2): 47.0 wt %

(3) Heterophasic Propylene Polymer Material-3 (NOBLEN AZ564, manufactured by Sumitomo Chemical Co., Ltd.)
Content of propylene copolymer (A-3): 87 wt %
Content of propylene copolymer (B-3): 13 wt %
Content of monomer unit derived from ethylene in propylene copolymer (A-3): 0 wt %
Content of monomer unit derived from ethylene in propylene copolymer (B-3): 46 wt %

(4) Propylene-Ethylene Copolymer-1 (NOBLEN Z144CE4, manufactured by Sumitomo Chemical Co., Ltd.)
MFR=27 g/10 min; melting temperature=141° C.; content of monomer derived from propylene=96 wt %; content of monomer derived from ethylene=4 wt %

(5) Ethylene-1-Octene Copolymer-1
Engage 8842, manufactured by The Dow Chemical Company
(Density=0.857 g/cm$^3$)

(6) Ethylene-1-Butene Copolymer-1
Engage 7487, manufactured by The Dow Chemical Company
(Density=0.860 g/cm$^3$)

(7) Crosslinking Agent-1
As a crosslinking agent-1, 2,5-dimethyl-2,5-di(t-butylperoxy)hexane (KAYAHEXA Ad-40C, manufactured by Kayaku Akzo Corporation, diluted with calcium carbonate and hydrated amorphous silicon dioxide to a concentration of 40 wt %) was used.

(8) Crosslinking Agent-2
As a crosslinking agent-2, 2,5-dimethyl-2,5-di(t-butylperoxy)hexane (KAYAHEXA APO-10DL, manufactured by Kayaku Akzo Corporation, diluted with paraffin-based oil to a concentration of 10 wt %) was used.

(9) Crosslinking Aid
As a crosslinking aid, trimethylolpropane trimethacrylate (Hi-Cross MS-50, manufactured by Seiko Chemical Co., Ltd., diluted with an inorganic filler (amorphous silica) to a concentration of 50 wt %) was used.

(10) Other Materials
Release agent: Erucamide (NEUTRON-S, manufactured by Nippon Fine Chemical)
Antioxidant 1: Irganox 1010, manufactured by BASF Japan Ltd.
Antioxidant 2: Irgafos 168, manufactured by BASF Japan Ltd.
Antioxidant 3: SUMILIZER GA-80, manufactured by Sumitomo Chemical Co., Ltd.
Light stabilizer 1: Sumisorb 300, manufactured by Sumitomo Chemical Co., Ltd.
Light stabilizer 2: Tinuvin 622SF, manufactured by BASF Japan Ltd.
Light stabilizer 3: Tinuvin XT850FF, manufactured by BASF Japan Ltd.
Light stabilizer 4: Tinuvin 123, manufactured by BASF Japan Ltd.
Preservative (inorganic filler): Hydrotalcite (DHT-4A, manufactured by Kyowa Chemical Industry Co., Ltd.)
Inorganic filler: Calcium carbonate (Vigot-10, manufactured by Shiraishi Calcium Kaisha, Ltd.)

Example 1

To 100 parts by weight of the heterophasic propylene polymer material-1, 0.7 parts by weight of the crosslinking agent-1 (0.28 parts by weight as an addition amount of 2,5-dimethyl-2,5-di(t-butylperoxy)hexane), 0.8 parts by weight of the crosslinking aid (0.4 parts by weight as an addition amount of trimethylolpropane trimethacrylate), 0.15 parts by weight of the release agent, 0.2 parts by weight of the antioxidant 1, 0.1 parts by weight of the antioxidant 2, 0.2 parts by weight of the light stabilizer 1, 0.1 parts by weight of the light stabilizer 2, 0.1 parts by weight of the light stabilizer 3, and 0.2 parts by weight of the preservative were added, and melting and kneading was performed at a cylinder temperature of 200° C. for about 1 minute with a twin-screw extruder, thereby obtaining a thermoplastic elastomer composition.

Examples 2 and 3

Thermoplastic elastomer compositions of Examples 2 and 3 were produced in the same manner as that of Example 1 except that materials shown in Table 2 were used.

Example 4

A thermoplastic elastomer composition of Example 4 was produced in the same manner as that of Example 1 except that the preservative was not added.

Example 5

To 75 parts by weight of the heterophasic propylene polymer material-1 and 25 parts by weight of the heterophasic propylene polymer material-2 (the total amount of the heterophasic propylene polymer material-1 and the heterophasic propylene polymer material-2 is 100 parts by weight), 0.5 parts by weight of the crosslinking agent-1 (0.20 parts by weight as an addition amount of 2,5-dimethyl-2,5-di(t-butylperoxy)hexane), 0.8 parts by weight of the crosslinking aid (0.4 parts by weight as an addition amount of trimethylolpropane trimethacrylate), 0.15 parts by weight of the release agent, 0.2 parts by weight of the antioxidant 1, 0.1 parts by weight of the antioxidant 2, 0.2 parts by weight of the light stabilizer 1, 0.1 parts by weight of the light stabilizer 2, 0.1 parts by weight of the light stabilizer 3, and 0.2 parts by weight of the preservative were added, and melting and kneading was performed at a cylinder temperature of 200° C. for about 1 minute with a twin-screw extruder, thereby obtaining a thermoplastic elastomer composition.

Comparative Examples 1 to 5 and 8

Thermoplastic elastomer compositions of Comparative Examples 1 to 5 and 8 were produced in the same manner as that of Example 1 except that materials shown in Table 3 were used.

Comparative Example 6

To 35 parts by weight of the heterophasic propylene polymer material-3, 20 parts by weight of a propylene-ethylene copolymer-1, 20 parts by weight of an ethylene-1-octene copolymer-1, and 25 parts by weight of an ethylene-1-butene copolymer-1 (the total amount of the heterophasic propylene polymer material-3, the propylene-ethylene copolymer-1, the ethylene-1-octene copolymer-1, and the ethylene-1-butene copolymer-1 is 100 parts by weight), 2.0 parts by weight of the crosslinking agent-2 (0.2 parts by weight as an addition amount of 2,5-dimethyl-2,5-di(t-butylperoxy) hexane), 0.5 parts by weight of the crosslinking aid (0.25 parts by weight as an addition amount of trimethylolpropane trimethacrylate), 0.05 parts by weight of the release agent, 0.1 parts by weight of the antioxidant 2, 0.2 parts by weight of the antioxidant 3, 0.2 parts by weight of the light stabilizer 1, 0.1 parts by weight of the light stabilizer 2, 0.1 parts by weight of the light stabilizer 4, 0.2 parts by weight of The preservative, and 0.6 parts by weight of the inorganic filler were added, and melting and kneading was performed at a cylinder temperature of 200° C. for about 1 minute with a twin-screw extruder, thereby obtaining a thermoplastic elastomer composition.

Comparative Example 7

A thermoplastic elastomer composition of Comparative Example 7 was produced in the same manner as that of Example 5 except that the materials shown in Table 3 were used.

TABLE 2

| | | | Example 1 | Example 2 | Example 3 | Example 4 | Example 5 |
|---|---|---|---|---|---|---|---|
| Isothermal crystallization time measured at 130° C. (seconds) | | | 1587 | 1933 | 1524 | 1378 | 921 |
| Content of insoluble component in ortho-dichlorobenzene at 140° C. (parts by weight) | | | 24.4 | 29.7 | 25.1 | 27.1 | 21.6 |
| Heterophasic propylene polymer material | Propylene copolymer (A) | (A)-1 | 50.4 | 50.4 | 50.4 | 50.4 | 37.8 |
| | | (A)-2 | | | | | 11.8 |
| | | (A)-3 | | | | | |
| | Propylene copolymer (B) | (B)-1 | 49.6 | 49.6 | 49.6 | 49.6 | 37.2 |
| | | (B)-2 | | | | | 13.2 |
| | | (B)-3 | | | | | |
| Propylene-ethylene copolymer | | | | | | | |
| Ethylene-octen copolymer | | | | | | | |
| Ethylene-butene copolymer | | | | | | | |
| Crosslinking agent | 2,5-dimethyl-2,5-di(t-butylperoxy)hexane | | 0.20 | 0.28 | 0.32 | 0.28 | 0.20 |
| Crosslinking aid | trimethylolpropane trimethacrylate | | 0.40 | 0.40 | 0.40 | 0.40 | 0.40 |

TABLE 3

|  |  |  | Comparative Example 1 | Comparative Example 2 | Comparative Example 3 | Comparative Example 4 | Comparative Example 5 |
|---|---|---|---|---|---|---|---|
| Isothermal crystallization time measured at 130° C. (seconds) | | | 1621 | 1593 | 220 | 226 | 1545 |
| Content of insoluble component in ortho-dichlorobenzene at 140° C. (parts by weight) | | | 8.8 | 13.4 | 36.9 | 27.8 | 9.5 |
| Heterophasic propylene polymer material | Propylene copolymer (A) | (A)-1 | 50.4 | 50.4 | | | 50.4 |
| | | (A)-2 | | | 47.1 | 47.1 | |
| | | (A)-3 | | | | | |
| | Propylene copolymer (B) | (B)-1 | 49.6 | 49.6 | | | 49.6 |
| | | (B)-2 | | | 52.9 | 52.9 | |
| | | (B)-3 | | | | | |
| Propylene-ethylene copolymer | | | | | | | |
| Ethylene-octen copolymer | | | | | | | |
| Ethylene-butene copolymer | | | | | | | |
| Crosslinking agent | 2,5-dimethyl-2,5-di(t-butylperoxy)hexane | | 0.05 | 0.10 | 0.28 | 0.20 | 0.28 |
| Crosslinking aid | trimethylolpropane trimethacrylate | | 0.40 | 0.40 | 0.40 | 0.40 | 0.00 |

|  |  |  | Comparative Example 6 | Comparative Example 7 | Comparative Example 8 |
|---|---|---|---|---|---|
| Isothermal crystallization time measured at 130° C. (seconds) | | | 97 | 973 | 44 |
| Content of insoluble component in ortho-dichlorobenzene at 140° C. (parts by weight) | | | 19.0 | 14.8 | 15.3 |
| Heterophasic propylene polymer material | Propylene copolymer (A) | (A)-1 | | 37.8 | |
| | | (A)-2 | | 11.8 | |
| | | (A)-3 | 30.5 | | 87 |
| | Propylene copolymer (B) | (B)-1 | | 37.2 | |
| | | (B)-2 | | 13.2 | |
| | | (B)-3 | 4.5 | | 13 |
| Propylene-ethylene copolymer | | | 20.0 | | |
| Ethylene-octen copolymer | | | 20.0 | | |
| Ethylene-butene copolymer | | | 25.0 | | |
| Crosslinking agent | 2,5-dimethyl-2,5-di(t-butylperoxy)hexane | | 0.20 | 0.15 | 0.28 |
| Crosslinking aid | trimethylolpropane trimethacrylate | | 0.25 | 0.40 | 0.40 |

Production of Injection Molded Article

To 100 parts by weight of the thermoplastic elastomer compositions of Examples 1 to 5 and Comparative Examples 1 to 8, 1 part by weight of a black pigment master batch (trade name: SPEC824, manufactured by Sumika Color Co., Ltd.) was added, and injection molding was performed at a cylinder temperature of 220° C. and a mold temperature of 25° C. with an injection molding machine (trade name: SE180D, manufactured by Sumitomo Heavy Industries, Ltd.).

A flat plate mold (400×100×3 mm) was used as a mold, a resin flat plate (64×12.7×2 mm) was provided on a core side (movable side) of the flat plate mold, and a embossed insert was provided in a cavity of the flat plate mold. In addition, a thin portion (tear line portion) having a thickness of 1.0 mm was provided at a position at which the resin flat plate is provided.

Evaluation of Physical Properties

Various physical properties of the thermoplastic elastomer compositions and the injection molded articles of Examples 1 to 5 and Comparative Examples 1 to 8 were evaluated by the following methods.

(1) Melt Flow Rate (MFR)

A melt flow rate was measured at 230° C. and a load of 21.18 N in accordance with JIS K7210:1999.

(2) Melting Temperature

A differential scanning calorimetry curve was measured under the following measurement conditions with a heat flux-type differential scanning calorimeter (DSC Q100, manufactured by TA Instruments), and a melting temperature (° C.) was obtained from the differential scanning calorimetry curve in a temperature-raising operation.

Measurement Conditions

Temperature lowering operation: Melting was performed at 220° C., and then a temperature was lowered from 220° C. to −90° C. at a temperature lowering rate of 5° C./min.

Temperature-raising operation: After the temperature lowing operation, the temperature was immediately raised from −90° C. to 200° C. at 5° C./min.

(3) Isothermal Crystallization Time

The sample was held at 200° C. for 5 minutes, and then cooled to 130° C. at about 320° C. to 340° C./min and held, under a nitrogen atmosphere, using a heat flux-type differential scanning calorimeter (DSC8500, manufactured by PerkinElmer Inc.). In this case, a relationship between a calorific value obtained by crystallization of the sample and a time was measured, and the time taken to reach one-half of the total calorific value was taken as an isothermal crystallization time (seconds).

Each of the thermoplastic elastomer compositions of Examples and Comparative Examples is interposed between flat plates, pressed at 230° C. and 1 MPa for 5 minutes, and then cooled to obtain a press sheet (thickness of 0.2 mm). The obtained press sheet is used as a measuring sample.

(4) Content of Insoluble Component in Ortho-Dichlorobenzene at 140° C.

The content of the insoluble component in ortho-dichlorobenzene at 140° C. was obtained according to the following measurement conditions using GPC and a method for calculating a content of an insoluble component in ortho-dichlorobenzene at 140° C.

Measurement Condition Using GPC

GPC apparatus: HLC-8121GPC/HT (manufactured by Tosoh Corporation)

GPC column: Three TSKgel GMH6-HT 7.8 mm I.D.×300 mm (manufactured by Tosoh Corporation)

Mobile phase: Ortho-dichlorobenzene (special grade, manufactured by FUJIFILM Wako Pure Chemical Corporation) to which 2,6-di-t-butyl-4-methylphenol (BHT) (special grade, purity of 98%, manufactured by FUJIFILM Wako Pure Chemical Corporation) was added at 0.1 w/V % as an antioxidant that suppresses decomposition of a polymer was used for a mobile phase.

Flow rate: 1 ml/min
Column oven temperature: 140° C.
Autosampler temperature: 140° C.
System oven temperature: 40° C.
Detection: Refractive index detector (RID)
RID cell temperature: 140° C.
Sample solution injection amount: 300 μl
Dissolving solvent: Same as the mobile phase
Automatic shaker for dissolution: DF-8020 (manufactured by Tosoh Corporation)

Sample solution preparation procedure: 20.0 mg of the thermoplastic elastomer composition and 20.0 ml of the dissolving solvent were charged into a 30 ml screw vial, the screw vial was capped and placed into the automatic shaker for dissolution, and then stirring was performed at 140° C. for 120 minutes. Then, the obtained solution was passed through a filter having a pore size of 0.8 μm or more to be filtered. Here, the filtering was performed at 140° C. or higher and within 20 minutes in order to avoid a concentration change due to solvent evaporation. By these operations, a sample solution for GPC measurement was prepared.

Method for Calculating Content of Insoluble Component in Ortho-Dichlorobenzene at 140° C.

The content of the insoluble component in ortho-dichlorobenzene at 140° C. was calculated by the following Equation (3).

$$\text{Content (wt \%) of insoluble component in ortho-dichlorobenzene at } 140° C. = (1 - B/A) \times 100 \quad (3)$$

In Equation (3), A is a peak area obtained by applying a polyethylene standard material NIST1475a to the measurement using GPC, and drawing a baseline to a peak in the obtained chromatogram. In addition, B is a peak area obtained by applying a sample solution to the measurement using GPC, and drawing a baseline to a peak in the obtained chromatogram. The baseline was set based on the description of 15016014-1.

(5) Content of Soluble Component and Insoluble Component in Ortho-Dichlorobenzene at 50° C.

Contents of a soluble component and an insoluble component in ortho-dichlorobenzene at 50° C. were obtained according to a calculation method based on the following measurement conditions using CFC.

Measurement Conditions Using CFC

CFC apparatus: Automated 3D analyzer CFC-2, manufactured by Polymer Characterization, S.A.

TREF column: Stainless steel micro-ball packed column (3/8" o.d.×150 mm), manufactured by Polymer Characterization, S.A.

Solvent and GPC mobile phase: Ortho-dichlorobenzene (special grade, manufactured by FUJIFILM Wako Pure Chemical Corporation) to which 2,6-di-t-butyl-4-methylphenol (BHT) (special grade, purity of 98%, manufactured by FUJIFILM Wako Pure Chemical Corporation) was added at 0.05 w/V % as an antioxidant that suppresses decomposition of a polymer was used for a solvent and a GPC mobile phase.

Sample solution concentration: Addition of 20 ml of solvent to 20 mg of sample

Sample dissolution: Heating and stirring at 145° C. for 60 minutes

Injection amount to TREF column: 0.5 ml

GPC column: Three TSKgel GMHHR-H(S)HT2 7.8 mm I.D. 300 mm (manufactured by Tosoh Corporation)

Flow rate of GPC mobile phase: 1.0 ml/min

Detector: Infrared spectrophotometer IR5 (built-in CFC apparatus), manufactured by Polymer Characterization, S.A.

Calibration of GPC column: 5 mg of each of standard polystyrenes (F-1, F-2, F-4, F-10, F-40, F-80, F-288, F-850, A-500, A-1000, and A-2500) manufactured by Tosoh Corporation were weighed and combined each other as shown in Table 4, each 20 ml of solvent was added thereto, dissolution was performed at 145° C. for 1 hour, the obtained solutions were subjected to GPC analysis, and calibration was performed by creating a calibration curve from a relationship between a molecular weight and a peak top elution time of each standard polystyrene.

TABLE 4

| Combination 1 | F-850, F-80, F-1 |
|---|---|
| Combination 2 | F-288, F-10, A-2500 |
| Combination 3 | F-80, F-4, A-1000 |
| Combination 4 | F-40, F-2, A-500 |

Calibration of infrared spectrophotometer: 20 ml of a solvent was added to 10 mg of each of a polyethylene standard material NIST1475a and an isotactic polypropylene sample (product No.: 182389) manufactured by Merck Co., Inc., dissolution was performed at 145° C. for 1 hour, the obtained solutions were subjected to GPC analysis, and a calibration curve on which $CH_3/1000\,C$ of the former is 0.1 and $CH_3/1000\,C$ of the latter is 333.3 was created to obtain $CH_3/1000\,C$ of the sample.

Measurement procedure: 20 ml of a solvent is added to 20 mg of a sample, and heating and stirring are performed at 145° C. of 60 minutes, thereby preparing a sample solution. 0.5 ml of the obtained sample solution was injected to a temperature rising elution fractionation (TREF) column held at 145° C. in the CFC apparatus and held for 20 minutes. Then, the temperature of the TREF column was lowered to 100° C. at a rate of 20° C./min and held at 100° C. for 20 minutes. Then, the temperature of the TREF column was lowered to 30° C. at a rate of 0.5° C./min and held at 30° C.

for 30 minutes. Then, the temperature of the TREF column was raised to 50° C. at a rate of 20° C./min and held at 50° C. for about 19 minutes. Then, an elution amount, Mw, and $CH_3/1000$ C at 50° C. were measured with GPC (embedded CFC) equipped with an infrared spectrophotometer. Then, after the temperature of the TREF column was raised to 140° C. at a rate of 20° C./min and held for about 19 minutes, the elution amount, Mw, and $CH_3/1000$ C at 140° C. were measured in GPC (embedded in CFC) equipped with an infrared spectrophotometer. From a proportion (wt %) of each of the elution amount at 140° C. and the elution amount at 50° C. to the total elution amount, the amount (wt %) of each of the soluble component in ortho-dichlorobenzene at 50° C. and the insoluble component in ortho-dichlorobenzene at 50° C. with respect to the soluble component in ortho-dichlorobenzene at 140° C. in the thermoplastic elastomer composition was obtained.

(6) Method of Producing Injection Molded Article for Physical Property Evaluation Separately from the injection molded article, using a side gate flat plate mold in an injection molding machine EC160NII manufactured by Toshiba Machine Co., Ltd., the thermoplastic elastomer compositions of Examples and Comparative Examples were injection molded at a cylinder temperature of 220° C. and a mold temperature of 50° C., thereby obtaining injection molded articles (90 mm in length, 150 mm in width, and 2 mm in thickness).

(6-1) Tensile Strength at Break (TB) and Elongation at Break (EB)

A tensile strength at break and an elongation at break of the injection molded article produced in (7) were measured in accordance with JIS K6251:1993. A JIS No. 3 dumbbell was used at a tensile speed of 200 mm/min.

(6-2) Low-Temperature Impact Resistance (IZOD)

An impact resistance of the injection molded article produced in (7) was measured in accordance with JIS K7110:1984.

The measurement temperature is −40° C.

NB=Not broken

B=Broken (7) Molding Appearance

A gloss unevenness that occurs on an embossed surface of the injection molded article was visually observed, and determination was performed based on the following criteria. When performing visual observation, the observation was performed by illuminating a gloss unevenness portion with a stand light so that the gloss unevenness is conspicuous.

○: Gloss unevenness of the tear line portion was not observed.

x: Gloss unevenness of the tear line portion was observed.

The results are shown in Tables 5 and 6.

TABLE 5

| | | Example 1 | Example 2 | Example 3 | Example 4 | Example 5 |
|---|---|---|---|---|---|---|
| Appearance | Visual observation (○ or X) | ○ | ○ | ○ | ○ | ○ |
| Low-temperature Impact Resistance | −40° C. (Destruction status) | NB | NB | NB | NB | NB |
| High tensile strength | MPa | 8.5 | 11 | 9.1 | 8.3 | 8.43 |
| Tensile elongation | % | 320 | 460 | 410 | 290 | 220 |
| Flexural modulus | MPa | 250 | 270 | 240 | 270 | 290 |
| MFR | g/10 min | 7.6 | 12 | 14.1 | 12.6 | 6.8 |

TABLE 6

| | | Comparative Example 1 | Comparative Example 2 | Comparative Example 3 | Comparative Example 4 | Comparative Example 5 |
|---|---|---|---|---|---|---|
| Appearance | Visual observation (○ or X) | X | X | X | X | X |
| Low-temperature Impact Resistance | −40° C. (Destruction status) | NB | NB | NB | NB | NB |
| High tensile strength | MPa | 11.7 | 9.6 | 9.5 | 9.5 | 7.0 |
| Tensile elongation | % | 510 | 400 | 260 | 300 | 70 |
| Flexural modulus | MPa | 260 | 270 | 300 | 300 | 240 |
| MFR | g/10 min | 5.4 | 5.6 | 8.3 | 4.9 | 38 |

| | | Comparative Example 6 | Comparative Example 7 | Comparative Example 8 |
|---|---|---|---|---|
| Appearance | Visual observation (○ or X) | X | X | X |
| Low-temperature Impact Resistance | −40° C. (Destruction status) | NB | NB | NB |

TABLE 6-continued

|  |  |  |  |  |
|---|---|---|---|---|
| High tensile | MPa | 20.1 | 8.4 | 24.8 |
| Tensile elongation | % | 760 | 190 | 9 |
| Flexural modulus | MPa | 280 | 290 | 1160 |
| MFR | g/10 min | 6.6 | 5.1 | 174.2 |

The thermoplastic elastomer composition according to an aspect of the present invention is processed into a molded article such as an airbag cover, an automobile interior part such as an instrument panel or a pillar, an automobile exterior part such as a mold, a household appliance member, a constructional member, furniture, or general merchandise by a known molding processing method and preferably an injection molding method.

What is claimed is:

1. A thermoplastic elastomer composition comprising at least two olefin polymers, the thermoplastic elastomer composition satisfying the following requirements (I) and (II):
   (I) a content of an insoluble component in ortho-dichlorobenzene at 140° C. is 20 parts by weight to 50 parts by weight with respect to a total of 100 parts by weight of the thermoplastic elastomer composition, the content being measured by using gel permeation chromatography; and
   (II) an isothermal crystallization time measured at 130° C. using a heat flux-type differential scanning calorimeter is 300 seconds or longer.

2. The thermoplastic elastomer composition according to claim 1, wherein the content of the insoluble component is 20 parts by weight to 35 parts by weight.

3. The thermoplastic elastomer composition according to claim 1, wherein the content of the insoluble component is 24 parts by weight to 30 parts by weight.

4. The thermoplastic elastomer composition according to claim 1, wherein the isothermal crystallization time is 1,500 seconds to 2,000 seconds.

5. The thermoplastic elastomer composition according to claim 1, wherein the thermoplastic elastomer composition is a composition obtained by melting and kneading a heterophasic propylene polymer material in the presence of a crosslinking agent and a crosslinking aid,
   the heterophasic propylene polymer material contains a propylene copolymer (A) and a propylene copolymer (B),
   a content of the propylene copolymer (A) is 45 parts by weight to 65 parts by weight, and a content of the propylene copolymer (B) is 35 parts by weight to 55 parts by weight, with respect to a total of 100 parts by weight of the propylene copolymer (A) and the propylene copolymer (B),
   the propylene copolymer (A) includes:
   a monomer unit (A1) derived from propylene; and
   a monomer unit (A2) derived from at least one monomer selected from the group consisting of ethylene and α-olefin having 4 to 12 carbon atoms,
   a content of the monomer unit (A1) is 95 parts by weight to 99.9 parts by weight, and a content of the monomer unit (A2) is 0.1 parts by weight to 5 parts by weight, with respect to a total of 100 parts by weight of the monomer unit (A1) and the monomer unit (A2),
   the propylene copolymer (B) includes:
   a monomer unit (B1) derived from propylene; and
   a monomer unit (B2) derived from at least one monomer selected from the group consisting of ethylene and α-olefin having 4 to 12 carbon atoms, and
   a content of the monomer unit (B1) is 20 parts by weight to 78 parts by weight, and a content of the monomer unit (B2) is 22 parts by weight to 80 parts by weight, with respect to a total of 100 parts by weight of the monomer unit (B1) and the monomer unit (B2).

6. The thermoplastic elastomer composition according to claim 5, wherein a weight average molecular weight of the propylene copolymer (A) is $1.0 \times 10^5$ to 7.0 to $10^5$, and a weight average molecular weight of the propylene copolymer (B) is $4.0 \times 10^4$ to 1.3 to $10^6$.

7. The thermoplastic elastomer composition according to claim 5, wherein a weight average molecular weight of the propylene copolymer (B) is $2.0 \times 10^5$ to $1.1 \times 10^6$.

8. The thermoplastic elastomer composition according to claim 5, wherein the crosslinking agent is organic peroxide.

9. The thermoplastic elastomer composition according to claim 5, wherein the crosslinking aid is at least one compound selected from the group consisting of a maleimide compound, a multi-functional vinyl compound, and a multi-functional acrylate compound.

10. The thermoplastic elastomer composition according to claim 5, wherein the melting and kneading is performed at a temperature of 170° C. to 270° C.

11. The thermoplastic elastomer composition according to claim 5, wherein the heterophasic propylene polymer material is a polymer material obtained by a multi-stage polymerization.

12. A method of producing a thermoplastic elastomer composition, the method comprising a step of melting and kneading a heterophasic propylene polymer material in the presence of a crosslinking agent and a crosslinking aid,
   wherein the heterophasic propylene polymer material contains a propylene copolymer (A) and a propylene copolymer (B),
   a content of the propylene copolymer (A) is 45 parts by weight to 65 parts by weight, and a content of the propylene copolymer (B) is 35 parts by weight to 55 parts by weight, with respect to a total of 100 parts by weight of the propylene copolymer (A) and the propylene copolymer (B),
   the propylene copolymer (A) includes:
   a monomer unit (A1) derived from propylene; and
   a monomer unit (A2) derived from at least one monomer selected from the group consisting of ethylene and α-olefin having 4 to 12 carbon atoms,
   a content of the monomer unit (A1) is 95 parts by weight to 99.9 parts by weight, and a content of the monomer unit (A2) is 0.1 parts by weight to 5 parts by weight, with respect to a total of 100 parts by weight of the monomer unit (A1) and the monomer unit (A2), the propylene copolymer (B) includes:
a monomer unit (B1) derived from propylene; and
a monomer unit (B2) derived from at least one monomer selected from the group consisting of ethylene and α-olefin having 4 to 12 carbon atoms,
a content of the monomer unit (B1) is 20 parts by weight to 78 parts by weight, and a content of the monomer unit (B2) is 22 parts by weight to 80 parts by weight, with respect to a total of 100 parts by weight of the monomer unit (B1) and the monomer unit (B2), and
the thermoplastic elastomer composition satisfies the following requirements (I) and (II):
(I) a content of an insoluble component in ortho-dichlorobenzene at 140° C. is 20 parts by weight to 50 parts by weight with respect to a total of 100 parts by weight of the thermoplastic elastomer composition, the content being measured by using gel permeation chromatography; and
(II) an isothermal crystallization time measured at 130° C. using a heat flux-type differential scanning calorimeter is 300 seconds or longer.

13. A molded article including the thermoplastic elastomer composition according to claim 1.

14. An airbag cover including the thermoplastic elastomer composition according to claim 1.

* * * * *